(12) United States Patent
Cho et al.

(10) Patent No.: US 9,755,702 B2
(45) Date of Patent: Sep. 5, 2017

(54) METHOD OF OPERATING NEAR FIELD COMMUNICATION (NFC) DEVICE AND NFC DEVICE

(71) Applicants: Jong-Pil Cho, Hwaseong-si (KR); Il-Jong Song, Suwon-si (KR); Byeong-Hoon Lee, Seoul (KR)

(72) Inventors: Jong-Pil Cho, Hwaseong-si (KR); Il-Jong Song, Suwon-si (KR); Byeong-Hoon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/803,590

(22) Filed: Jul. 20, 2015

(65) Prior Publication Data

US 2017/0026088 A1 Jan. 26, 2017
US 2017/0141819 A9 May 18, 2017

(30) Foreign Application Priority Data

Aug. 4, 2014 (KR) .................. 10-2014-0099876

(51) Int. Cl.
*H04B 5/00* (2006.01)
*H04W 52/18* (2009.01)
*H04W 52/48* (2009.01)

(52) U.S. Cl.
CPC ......... *H04B 5/0062* (2013.01); *H04B 5/0031* (2013.01)

(58) Field of Classification Search
CPC ... H04B 5/0062; H04B 5/0031; H04W 52/18; H04W 52/20; H04W 52/48
See application file for complete search history.

(56) References Cited

U.S. PATENT DOCUMENTS

| | | | |
|---|---|---|---|
| 5,698,838 A | 12/1997 | Yamaguchi | |
| 5,945,920 A | 8/1999 | Maletsky | |
| 7,487,921 B2 | 2/2009 | Takahashi et al. | |
| 8,245,943 B2 | 8/2012 | Uramoto | |
| 8,436,718 B2 | 5/2013 | Goto et al. | |
| 8,493,185 B2 | 7/2013 | Bateman | |
| 9,305,193 B2 * | 4/2016 | Lee | G06K 7/10158 |
| 2007/0246546 A1 * | 10/2007 | Yoshida | G06K 7/0008 235/492 |
| 2009/0273454 A1 | 11/2009 | Onozuka et al. | |
| 2010/0009627 A1 * | 1/2010 | Huomo | H04B 5/0031 455/41.1 |

(Continued)

FOREIGN PATENT DOCUMENTS

| | | | |
|---|---|---|---|
| KR | JP 2005-173862 A | 6/2005 | |
| KR | JP 2008-199536 A | 8/2008 | |

(Continued)

*Primary Examiner* — Andrew Wendell
(74) *Attorney, Agent, or Firm* — Volentine & Whitt, PLLC

(57) ABSTRACT

A method of operating a near field communication (NFC) device includes receiving, by the NFC device, a first signal from an NFC reader, transmitting, by the NFC device, a response to the first signal to the NFC reader and changing selectively, by the NFC device, a radio frequency (RF) configuration parameter associated with signal transmission operation during a signal transmission interval, based on determining whether the NFC reader recognizes the response.

16 Claims, 25 Drawing Sheets

(56) References Cited

U.S. PATENT DOCUMENTS

| | | | |
|---|---|---|---|
| 2012/0196529 A1* | 8/2012 | Huomo | G06Q 20/045 |
| | | | 455/41.1 |
| 2013/0078914 A1 | 3/2013 | Royston et al. | |
| 2013/0115876 A1 | 5/2013 | McFarthing | |
| 2014/0253396 A1* | 9/2014 | Cho | H01Q 1/2208 |
| | | | 343/702 |
| 2014/0370803 A1* | 12/2014 | Haverinen | H04B 5/0031 |
| | | | 455/41.1 |
| 2015/0115730 A1* | 4/2015 | Kanno | H02J 5/005 |
| | | | 307/104 |
| 2015/0155918 A1* | 6/2015 | Van Wageningen | H04B 5/0031 |
| | | | 307/104 |
| 2016/0072556 A1* | 3/2016 | Lee | H04B 5/0075 |
| | | | 455/41.1 |

FOREIGN PATENT DOCUMENTS

| | | |
|---|---|---|
| KR | 2011-0027423 A | 3/2011 |
| KR | 1105891 B | 1/2012 |

* cited by examiner

METHOD OF OPERATING NEAR FIELD COMMUNICATION (NFC) DEVICE AND NFC DEVICE

CROSS-REFERENCE TO RELATED APPLICATION

This application claims priority under 35 USC §119 to Korean Patent Application No. 10-2014-0099876, filed on Aug. 4, 2014, in the Korean Intellectual Property Office (KIPO), the contents of which are herein incorporated by reference in their entirety.

BACKGROUND

1. Technical Field

Embodiments of the inventive concept described herein relate to near field communication (NFC). In particular, the inventive concepts relate to a method of operating an NFC device and an NFC device.

2. Description of the Related Art

NFC technology is a type of wireless communication technology. Recent developments in NFC technology have resulted in NFC devices being used extensively in mobile devices.

NFC devices communicate with NFC readers with resonance frequency. When the NFC devices communicate with the NFC readers, errors due to various causes may occur.

SUMMARY

Example embodiments provide a method of operating an NFC device capable of reducing communication errors without increasing occupied area.

Example embodiments provide an NFC device capable of reducing communication errors without increasing occupied area.

According to some example embodiments, a method of operating a near field communication (NFC) device includes receiving, by the NFC device, a first signal from an NFC reader, transmitting, by the NFC device, a response to the first signal to the NFC reader and changing selectively, by the NFC device, a radio frequency (RF) configuration parameter associated with signal transmission operation during a signal transmission interval, based on determining whether the NFC reader recognizes the response.

In some embodiments, determining whether the NFC reader recognizes the response may include determining whether a reference time that elapses with an intensity of an electromagnetic wave which the NFC device receives is maintained after the NFC device transmits the response and changing, by the NFC device, the RF configuration parameter during the signal transmission interval when the reference time elapses.

The NFC device may again transmit a response to the first signal received again from the NFC reader after the NFC device changes the RF configuration parameter.

In some embodiments, determining whether the NFC reader recognizes the response may include receiving, by the NFC device, a second signal from the NFC reader, determining, by the NFC device, whether the first signal is the same as the second signal and changing, by the NFC device, the RF configuration parameter during the signal transmission interval when the first signal is the same as the second signal.

In some embodiments, determining whether the NFC reader recognizes the response may further include transmitting, by the NFC device, a response to the second signal to the NFC reader without changing the RF configuration parameter when the first signal is not the same as the second signal.

The first signal and the second signal may be a polling request for requesting a transmission of reception acknowledge information of the NFC device.

The first signal and the second signal may be a command that controls the NFC device.

In some embodiments, the NFC device may include a resonance unit and an NFC chip coupled to the resonance unit through a first power terminal and a second power terminal. The NFC chip may include a load modulation tuner coupled to the first power terminal, the second power terminal and a ground voltage, and the NFC chip may change the RF configuration parameter during the signal transmission interval by changing a load modulation amount of the load modulation tuner.

The NFC chip may change the RF configuration parameter by the load modulation tuner selectively connecting one of a current load and a resistive load at least between the first power terminal and the ground voltage and between the second power terminal and the ground voltage.

In some embodiments, the NFC device may include a resonance unit and an NFC chip coupled to the resonance unit through at least a first transmission terminal and a second transmission terminal. The NFC chip may include a transmitter, and the transmitter may change the RF configuration parameter during the signal transmission interval by changing a quality factor of the resonance unit.

The NFC chip may change the Q factor of the resonance unit by selectively connecting the first transmission terminal and the second transmission terminal to the ground voltage through a pull-down load.

In some embodiments, the NFC device may increase a bandwidth of the NFC device during the signal transmission interval by changing the RF configuration parameter, when the NFC reader does not recognize the response.

According to some example embodiments, a method of operating an NFC device includes receiving, by the NFC device, an input message from an NFC reader, changing selectively, by the NFC device, a radio frequency (RF) configuration parameter associated with signal reception operation during a signal reception interval, based on determining whether the signal reception operation is regularly or normally performed and transmitting, by the NFC device, a response to the input message to the NFC reader.

In some embodiments, determining whether the signal reception operation is regularly or normally performed may include determining, by a processor of the NFC device, whether a pattern of the input message is irregular or abnormal, and changing, by the NFC device, the RF configuration parameter during the signal reception interval when the pattern of the input message is irregular or abnormal.

The NFC device may receive again the input message from the NFC reader after the NFC device changes the RF configuration parameter.

In some embodiments, determining whether the signal reception operation is irregularly or normally performed may include determining, by a processor of the NFC device, whether an error occurs in a cyclic redundancy check (CRC) pattern in the input message, and changing, by the NFC device, the RF configuration parameter during the signal reception interval when an error occurs in the CRC pattern.

In some embodiments, determining whether the signal reception operation is irregularly or normally performed may include determining, by a processor of the NFC device, whether a data pattern in the input message is correct, refreshing a timer in the processor when the data pattern is correct, determining whether a reference time elapses after the timer is refreshed, and changing, by the NFC device, the RF configuration parameter during the signal reception interval when the reference time elapses after the timer is refreshed.

In some embodiments, the NFC device may include a resonance unit and an NFC chip coupled to the resonance unit through at least a first transmission terminal and a second transmission terminal. The NFC chip may includes a transmitter, and the transmitter may change the RF configuration parameter during the signal reception interval by changing a quality factor of the resonance unit.

The NFC chip may change the Q factor of the resonance unit by selectively connecting the first transmission terminal and the second transmission terminal to a ground voltage through a pull-down load.

In some embodiments, the NFC device may include a resonance unit and an NFC chip coupled to the resonance unit through at least a first power terminal and a second power terminal. The NFC chip may include a frequency tuner coupled to the first power terminal, the second power terminal and a ground voltage, and the frequency tuner may change the RF configuration parameter during the signal reception interval by changing a resonance frequency of the resonance unit.

The NFC chip may change the RF configuration parameter by the frequency tuner selectively connecting capacitive load between the first power terminal and the ground voltage and between the second power terminal and the ground voltage.

In some embodiments, the NFC device may include a resonance unit and an NFC chip coupled to the resonance unit through at least a first power terminal and a second power terminal. The NFC chip may include a demodulator that demodulates the input message, and the NFC chip may change the RF configuration parameter during the signal reception interval by adjusting an intensity of amplification of the input message in the demodulator.

According to some example embodiments, an NFC device includes a resonance unit and an NFC chip. The resonance unit exchanges a message from an NFC reader through a electromagnetic wave. The NFC chip provides an output message to the resonance unit, receives an input message from the resonance unit and selectively changes a radio frequency (RF) configuration parameter associated with a signal reception operation and a signal transmission operation of the resonance unit based on whether an error occurs in at least one of a signal reception operation and a signal transmission operation in a card mode.

In some embodiments, the resonance unit may be coupled to the to the NFC chip through at least a first transmission terminal and a second transmission terminal. The NFC chip may include a transmitter coupled between the first transmission terminal, the second transmission terminal and a ground voltage, and the transmitter may change the RF configuration parameter during at least one of the signal transmission operation and the signal reception operation.

In some embodiments, the resonance unit may be coupled to the to the NFC chip through at least a first power terminal and a second power terminal. The NFC chip may include a frequency tuner coupled between the first power terminal and the second power terminal, and the frequency tuner may change the RF configuration parameter by changing a resonance frequency of the resonance unit during the signal reception operation.

Accordingly, when an NFC device communicates with an NFC reader and communication errors occur in a signal transmission operation or signal reception operation, an NFC chip in the NFC device may change an RF configuration parameter of a resonance unit in the NFC device and the NFC device may retry communication with the NFC reader. Therefore, the NFC device may enhance communication performance without increasing occupied area.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Figure 1:
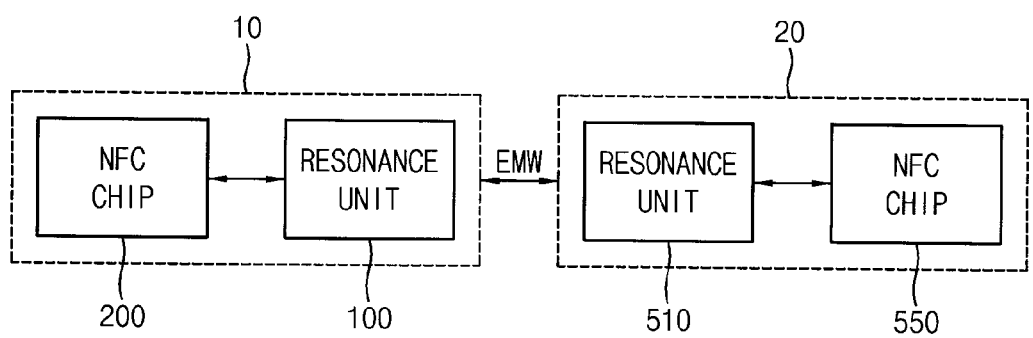
FIG. 1 is a block diagram illustrating a near field communication (NFC) system according to example embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a near field communication (NFC) system according to example embodiments. In an NFC system 5 of FIG. 1, NFC devices 10 and 20 communicate with each other based on an NFC scheme. In a card mode, in which the NFC device 10 operates as a card, the NFC device 10 may transceive data with an NFC device 20 (or NFC reader) based on an electromagnetic wave (EMW) provided from an NFC reader. In a reader mode, in which the NFC device 10 operates as a reader, the NFC device 10 may transceive data with the NFC device 20 based on an EMW provided from the NFC device 10.

Referring to FIG. 1, the NFC system 5 includes the NFC devices 10 and 20. The NFC device 10 may include a resonance unit 100 and an NFC chip 200. The NFC device 20 may include a resonance unit 510 and an NFC chip 550. During reception operation, the resonance unit 100 receives an input message from the NFC device 20 based on the EMW and the NFC chip 200 receives the input message from the resonance circuit 100. During transmission operation, the NFC chip 200 provides an output message to the resonance unit 100 and the resonance unit 100 transmits the output message to the NFC device 20 through the EMW.

In the card mode, the resonance unit 100 provides a signal, which is induced in response to the EMW received from the NFC device 20, to the NFC chip 200 and the NFC chip 200 performs the signal reception operation by generating the input message by demodulating the signal. In the card mode for a signal transmit operation, the NFC chip 200 provides a modulation signal, which is generated by modulating the output data, to the resonance unit 100 and the resonance unit 100 may perform the signal transmission operation by reflecting the EMW received from the NFC device 20 based on the modulation signal.

In the reader mode, the NFC chip 200 may provide a transmission signal as part of a signal transmission operation, which is obtained by synthesizing the modulation signal generated by modulating the output message with a carrier signal, to the resonance unit 100 and the resonance unit 100 provides the transmit signal in the form of the EMW to the NFC device 20 to perform the signal transmission operation. In the reader mode, the NFC chip 200 may provide a signal as part of a signal receive operation, which is induced in response to the EMW reflected from the NFC device 20, and the NFC chip 200 generates the input message by demodulating the signal to perform the signal reception operation.

The NFC chip 200 may reduce communication errors during the signal transmission operation by adaptively changing a radio frequency (RF) parameter associated with signal transmission operation during the signal transmission operation in the card mode. In addition, The NFC chip 200 may reduce communication errors during the signal reception operation by adaptively changing an RF parameter associated with the signal reception operation during the signal reception operation in the card mode.

NFC is a contactless short-range wireless communication standard between electronic devices within a short distance of 10 cm with low power consumption by using a frequency of 13.56 MHz, for example. A data transfer rate of an NFC system is 424 Kbps, for example, and an NFC system has excellent security due to high proximity and encryption technology. NFC forgoes a complicated pairing process for recognition of devices but allows devices to recognize one another within ¹⁄₁₀ second or less, for example. In particular, NFC is a smart card type contactless wireless communication technology where radio frequency identification (RFID) technology is utilized. In addition, NFC builds upon RFID technology by allowing two-way communication, as compared to smart cards, which have only one-way communication, and has a relatively large memory storage space and offers more variety of services.

In detail, NFC is a wireless communication method in which data is directly exchanged between terminals, for example, between the NFC device 10 and the NFC device 20, without using a communication network, and is a type of RFID method. A wireless communication method using RFID may be classified according to frequencies used. For example, RFID at 13.56 MHz is mainly used for smart cards, such as transit cards or entrance cards, and RFID at 900 MHz is used mainly for logistics. NFC corresponds to RFID which, like smartcards, uses a frequency of 13.56 MHz. However, unlike smartcards, which allow only one-way communication, NFC allows two-way communication. Accordingly, NFC is different from smart cards, which function merely as a tag that stores particular information and transmits the same to a reader. NFC communication allows a tag function according to necessity but also supports a function of recording information on the tag, and may be used in peer to peer (P2P) data exchange between terminals in which NFC is set.

Figure 2A:
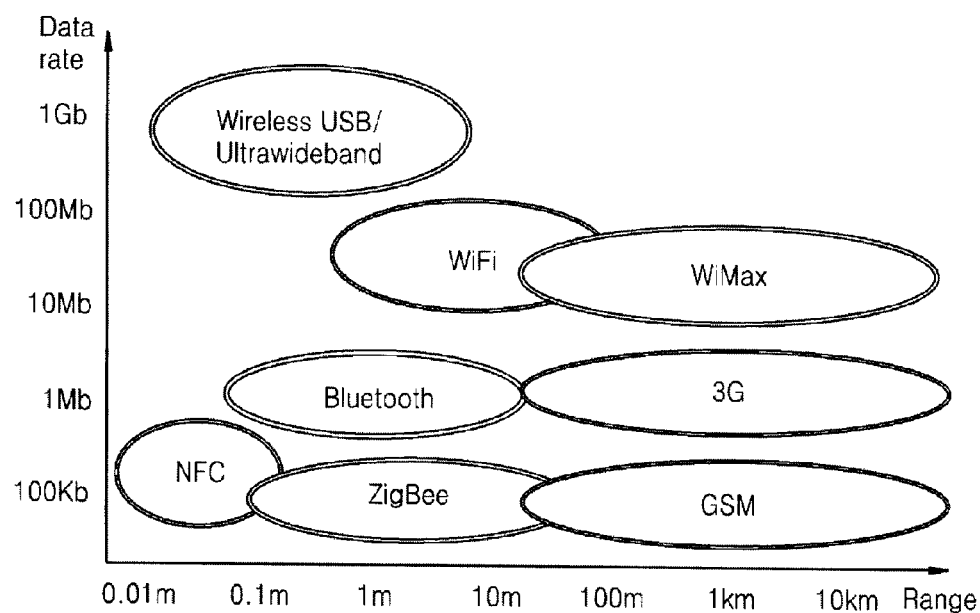
FIG. 2A is a graph comparing data rates and communication ranges of NFC and other wireless communication methods.

NFC which is developed based on RFID may be compared with other wireless communication methods, such as Wi-Fi Bluetooth, ZigBee, etc., as shown in FIG. 2A.

FIG. 2A is a graph comparing data rates and communication ranges of NFC and other wireless communication methods.

Referring to FIG. 2A, compared to other wireless communication methods, NFC may operate at a distance within about 10 cm. Unlike Bluetooth or Wi-Fi etc., which allow communication in about several to several tens of meters, NFC allows communication only within an extremely short distance (about 10 cm).

In addition, NFC may be compared to other wireless communication methods, such as Bluetooth, ZigBee, etc., as shown in Table 1 below.

TABLE 1

| Technology | Frequency used | security | Standard range | Major service area |
|---|---|---|---|---|
| NFC | 13.56 MHz | Encryption is applied | International Standard | contactless payment, RFID, file transmission |
| Bluetooth | 2.4 GHz | N/A | International Standard | file transmission |
| ZigBee | 2.4 GHz | N/A | International Standard | device control, RFID |
| 900 MHz RFID | 900 MHz | N/A | Korean Standard | RFID |

In other words, compared to other wireless communication methods, NFC operates only within a distance of 10 cm and encryption technology is applied thereto, and thus, a security level of NFC is high. Accordingly, when used in combination with other high-speed wireless communication methods, such as 3G or Wi-Fi, communication between devices vi an NFC may be performed with a higher efficiency and security. For example, when NFC and Bluetooth technology are combined, NFC may be used in connecting terminals (authorization) and Bluetooth may be used in data transmission between the terminals to thereby enable more efficient communication between the devices.

Figure 2B:
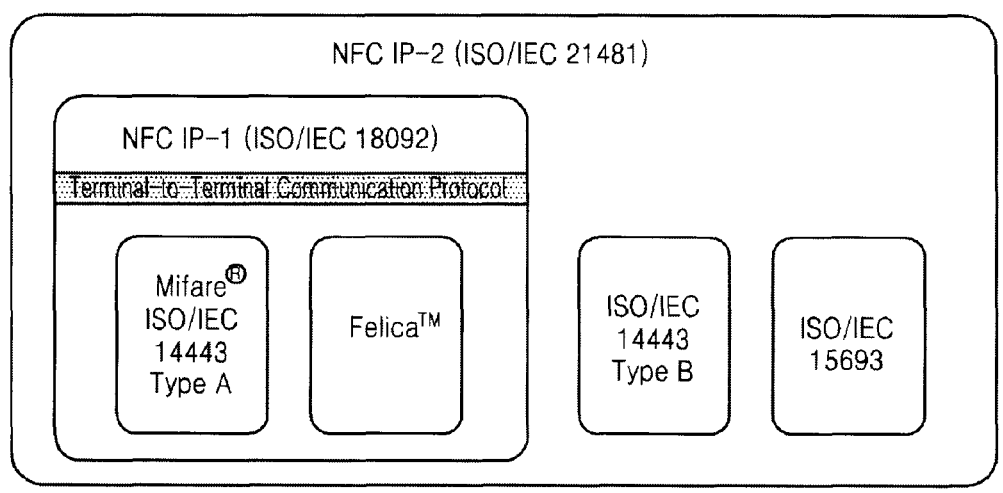
FIG. 2B is a schematic diagram that illustrates standards related to NFC technology.

FIG. 2B illustrates standards related to NFC technology. Referring to FIG. 2B, NFC standard technology follows International Organization for Standardization (ISO) and is also an extension of ISO 14443 Proximity-card Standard, and here, the inclusion relation of NFC IP-1 (NFC Interface Protocol-1)(ISO/IEC 18092) and NFC IP-2 (ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 3A:
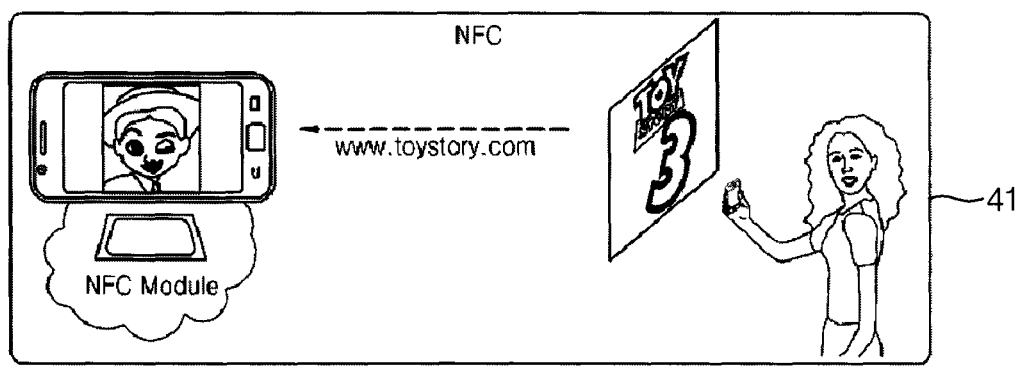
FIGS. 3A and 3B are diagrams explaining three communication modes of an NFC system.
Figure 3A:
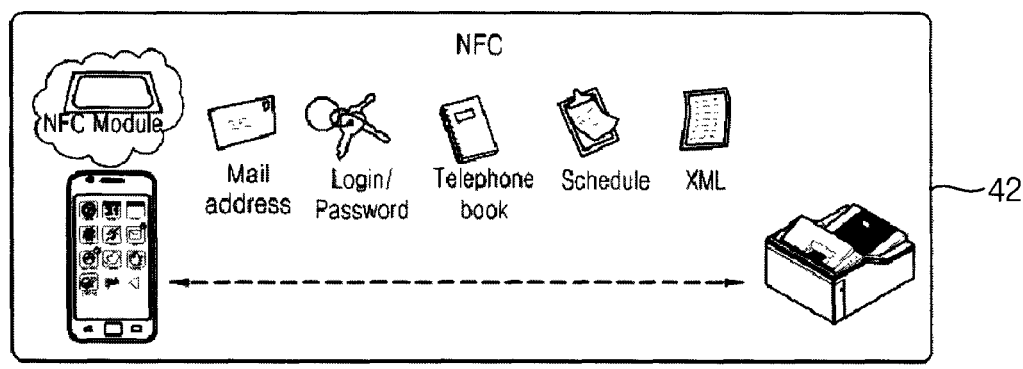
Figure 3A:
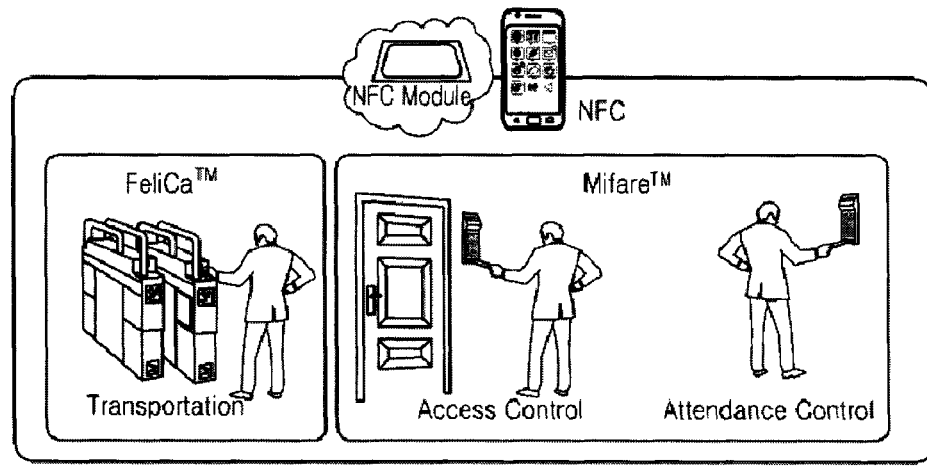
Figure 3B:
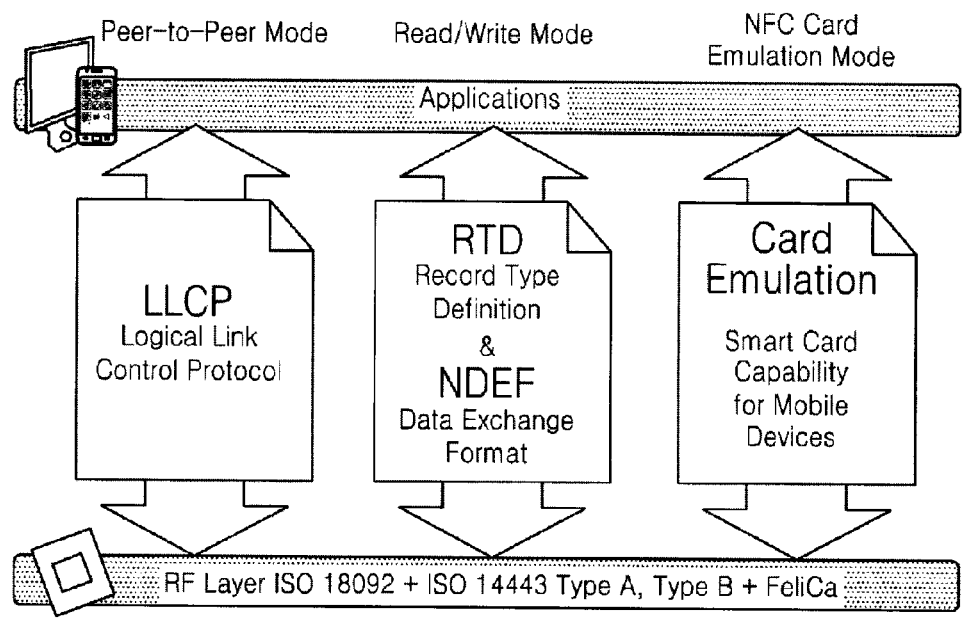

FIGS. 3A and 3B are diagrams explaining three communication modes of an NFC system. Referring to FIG. 3A, the NFC Forum has standardized major NFC communication modes, which are a Reader/Writer mode 41, a P2P mode 42, and a Card Emulation mode 43. In sum, the three communication modes of NFC may be listed as in Table 2 below.

TABLE 2

| | ISO/IEC 15693 | ISO/IEC 18092 | ISO/IEC 14443 |
|---|---|---|---|
| Operational mode | communication between reader and tag (VCD2 mode) | communication between devices (P2P mode) | communication between reader and tag (PCD1 mode) |
| Power supply | manual | active and manual | manual |
| Range of Communication | 1 m | 10~20 cm | 10 cm |
| Data rate | 26 Kbps or less | 106 Kbps, 212 Kbps, 424 Kbps | 106 Kbps |

(PCD: Proximity Coupling Device, VCD: Vicinity Coupling Device)

First, the Reader/Writer mode 41 supports the case where the NFC device 10, in which an NFC tag is embedded, operates as a reader to read another NFC tag or operates as a writer to input information to another NFC tag.

In the P2P mode 42, communication at a link level between two NFC terminals, for example, between the NFC device 10 and the NFC device 20, is supported. To establish a connection, a client (NFC P2P initiator, the NFC device 20) searches for a host (NFC P2P target, the NFC device 10) and transmits data of an NFC Data Exchange format (NDEF) message format. In the P2P mode 42, data, such as emails, schedules, telephone numbers, and XML data, may be exchanged just by touching the NFC device 10 with the NFC device 20.

Further, in the Card Emulation mode 43, the NFC device 20, in which an NFC tag is embedded, operates as a smart card (ISO/IEC 14443). Accordingly, NFC is compatible not only with ISO 14443, which is the international standard for contactless cards, but also with Felica by Sony and MiFare by Philips.

In order to coordinately provide the three communication modes of NFC, a protocol is standardized as illustrated in FIG. 3B. Referring to FIG. 3B, a software structure of an NFC system is illustrated.

Logical Link Control Protocol (LLCP) is a protocol that sets a communication connection between layers and controls the same. An NFC Data Exchange Format (NDEF) message is a basic message structure defined in an NFC communication protocol. The NDEF is a standard exchange format for Uniform Resource Identifier (URI), smart posters, and others, which defines a recording format regarding message exchange between NFC Forum-compatible devices and tags. An NDEF message includes at least one NDEF record. The NDEF record includes a payload that is described according to type, length, and option identifiers. An NDEF payload refers to application data included in an NDEF record. Record Type Definition (RTD) defines a record type and a type name which may correspond to an NDEF record.

Figure 4:
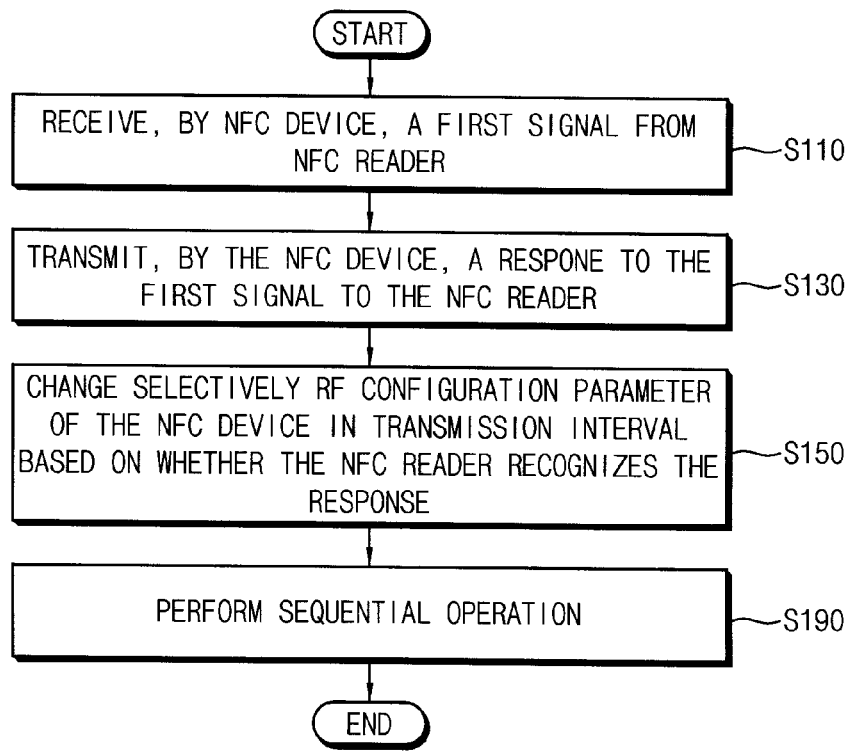
FIG. 4 is a flow chart illustrating a method of operating an NFC device according to example embodiments.

FIG. 4 is a flow chart illustrating a method of operating an NFC device according to example embodiments.

Referring to FIGS. 1 and 4, the NFC device 10 receives a first signal from the NFC reader 20 during a signal reception interval in the card mode (S110). The resonance unit 100 of the NFC device 10 may receive the NDEF message (input massage) through the EMW and the NFC chip 200 may receive the first signal by demodulating the NDEF message. The NFC device 10 transmits a response to the first signal to the NFC reader 20 during a signal transmission interval in the card mode (S130). The NFC chip 200 of the NFC device 10 incorporates the response in the NDEF message and transmits the response to the first signal to the NFC reader 20 through the resonance unit 100. The NFC device 10 may selectively change an RF configuration parameter associated with the signal transmission operation during a signal transmission interval, based on determining whether the NFC reader 20 recognizes the response (S150). When the NFC device 10 determines that the NFC reader 20 does not recognize the response after the NFC device 10 transmits the response to the NFC reader 20, the NFC device 10 may retry communication with the NFC reader 20 by changing the RF configuration parameter during the signal transmission interval. When the NFC device 10 determines that the NFC reader 20 recognizes the response after the NFC device 10 transmits the response to the NFC reader 20, the NFC device 10 may perform sequential operations (S190).

The NFC chip 200 may be coupled to the resonance unit 100 via first and second power terminals and the NFC chip 200 may change the RF configuration parameter during the signal transmission interval by changing a load modulation amount of a load modulation tuner which is coupled to the first power terminal, the second power terminal and a ground voltage.

In addition, the NFC chip 200 may be coupled to the resonance unit 100 via at least first and second transmission terminals and the NFC chip 200 may change the RF configuration parameter during the signal transmission interval by changing a quality (Q) factor of the resonance unit 100 in a transmitter which is coupled to the first transmission terminal, the second transmission terminal and a ground voltage.

Figure 5:
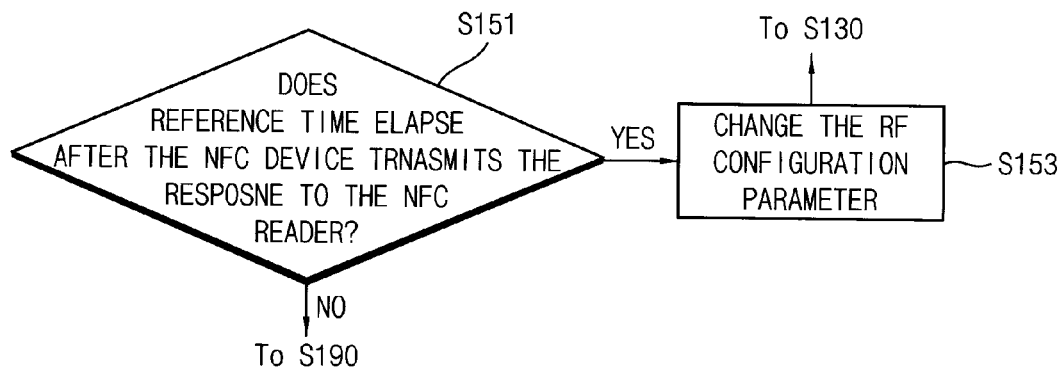
FIG. 5 is a flow chart illustrating a step of determining whether the NFC reader recognizes a response in FIG. 4 according to example embodiments.

FIG. 5 is a flow chart illustrating a step of determining whether the NFC reader recognizes a response in FIG. 4 according to example embodiments.

Referring to FIG. 5, for determining whether the NFC reader recognizes the response (S150a), the NFC device 10 determines whether a reference time that elapses with an intensity of the EMW from the NFC reader 20 is maintained after the NFC device 10 transmits the response to the NFC reader 20 (S151). The NFC chip 200 may include a timer for determining whether the reference time elapses. When the reference time elapses after the NFC device 10 transmits the response to the NFC reader 20 (YES in S151), the NFC chip 200 may change the RF configuration parameter during the signal transmission interval (S153). When the reference time does not elapse after the NFC device 10 transmits the response to the NFC reader 20 (NO in S151), the NFC device 10 may perform the sequential operations (S190). That is, when the intensity of the EMW from the NFC reader 20 is changed within the reference time, the NFC device 10 may perform the sequential operations because the NFC reader 20 recognizes the response.

Figure 6:
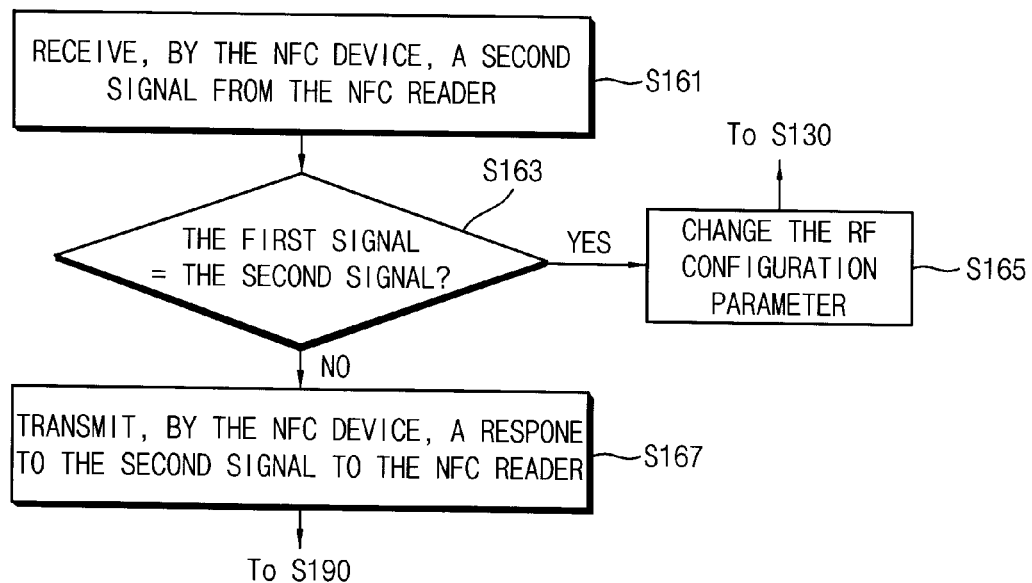
FIG. 6 is a flow chart illustrating a step of determining whether the NFC reader recognizes a response in FIG. 4 according to example embodiments.

FIG. 6 is a flow chart illustrating a step of determining whether the NFC reader recognizes a response in FIG. 4 according to example embodiments.

Referring to FIG. 6, for determining whether the NFC reader recognizes the response (S150b), the NFC device 10 receives a second signal from the NFC reader 20 during the signal reception interval in the card mode (S161). The NFC device 10 determines whether the first signal is the same as the second signal (S163). For determining whether the first signal is the same as the second signal, the NFC chip 200 may decode the received message and may determine whether signals in the decoded message are same using a decoder. When the first signal is the same as the second signal (YES in S163), which means communication retrial of the NFC reader 20, the NFC chip 200 may change the RF configuration parameter during the signal transmission interval (S165) and may transmit a response to the first signal which is received again from the NFC reader (S130). When the first signal is not the same as the second signal (NO in S163), which means non-communication retrial of the NFC reader 20, the NFC device 10 transmits a response to the second signal to the NFC reader 20 without changing the RF configuration parameter (S167).

In some embodiments, the first and second signals may be polling requests that request a transmission of reception confirmation information.

In some embodiments, the first and second signals may be commands for controlling the NFC device 10, and the command may be included in a control field of the NDEF message.

Figure 7:
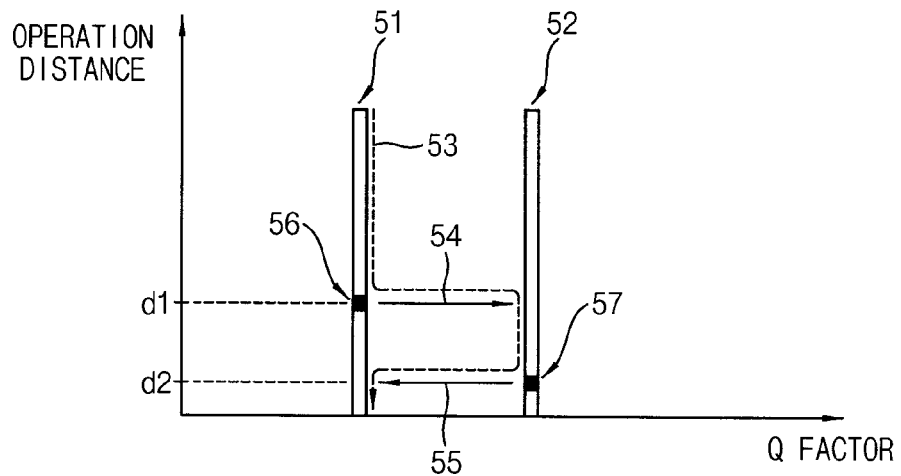
FIG. 7 is a graph illustrating a concept of a method of operating the NFC device according to example embodiments.

FIG. 7 is a graph illustrating a concept of a method of operating the NFC device according to example embodiments. In FIG. 7, a reference numeral 51 denotes a first Q factor depending on an operation distance between the NFC device 10 and the NFC reader 20, and a reference numeral 52 denotes a second Q factor depending on an operation distance between the NFC device 10 and the NFC reader 20 during the signal transmission interval of the NFC device 10.

Referring to FIG. 7, the NFC device 10 communicates with the NFC reader 20 with the first Q factor. When the operation distance between the NFC device 10 and the NFC reader 20 is a first distance d1, the NFC reader 20 does not recognize the response from the NFC device 10, which is referred to as a communication hole 56, because a resonance frequency shifts due to influence of a metal or a printed circuit board in the NFC device 10. When the communication hole occurs, the NFC device 10 changes the Q factor of the resonance unit 100 from the first Q factor 51 to the second Q factor 52 as a reference numeral 54 indicates and retries communication with the NFC reader 20. When the operation distance between the NFC device 10 and the NFC reader 20 is a second distance d2 as the NFC device 10 approaches the NFC reader 20 more closely, a communication hole 57 occurs at the second Q factor 52. When the communication hole occurs, the NFC device 10 changes the Q factor of the resonance unit 100 from the second Q factor 52 to the first Q factor 51 as a reference numeral 55 indicates and retries communication with the NFC reader 20. Therefore, the NFC device 10 may communicate with the NFC reader 20 without communication errors by changing the Q factor when the communication hole occurs according to the operation distance between the NFC device 10 and the NFC reader 20. In FIG. 7, a reference numeral 53 denotes a change of the Q factor according to the operation distance between the NFC device 10 and the NFC reader 20. When the Q factor is changed according to the operation distance between the NFC device 10 and the NFC reader 20, a bandwidth during the signal transmission interval may be changed.

Figure 8:
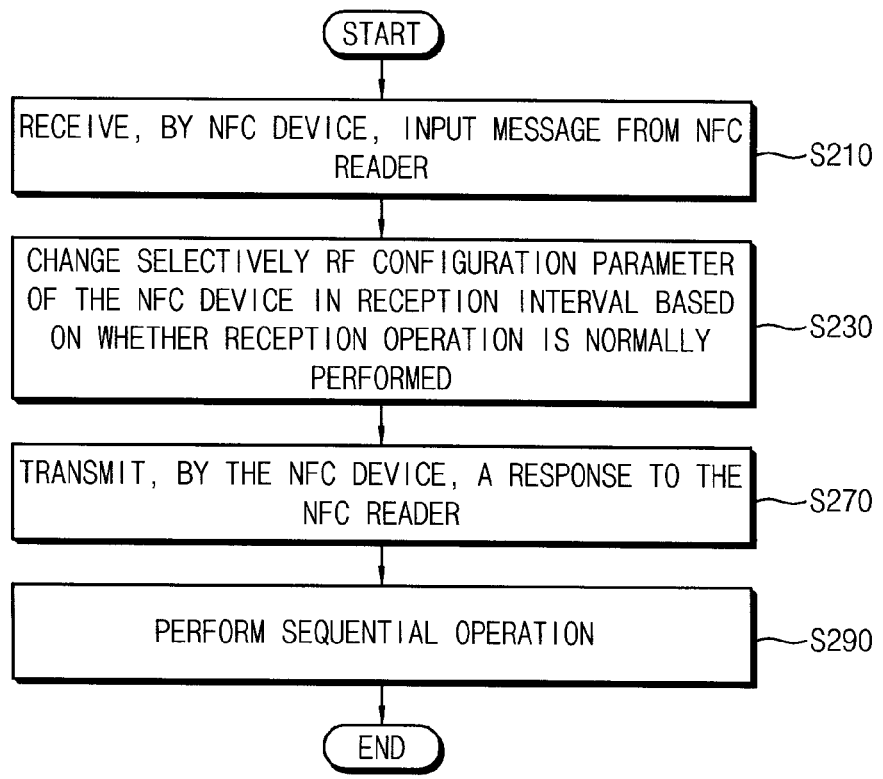
FIG. 8 is a flow chart illustrating a method of operating an NFC device according to example embodiments.

FIG. 8 is a flow chart illustrating a method of operating an NFC device according to example embodiments.

Referring to FIGS. 1 and 8, the NFC device 10 receives an input from the NFC reader 20 during the signal reception interval in the card mode (S210). The resonance unit 100 of the NFC device 10 may receive the NDEF message as the input message through the EMW during the signal reception interval in the card mode. The NFC device 10 may selectively change an RF configuration parameter associated with the signal reception operation during a signal reception interval, based on determining whether the signal reception operation is regularly or normally performed (S230). When the NFC device 10 determines that the signal reception operation is not normally performed, the NFC device 10 may retry communication with the NFC reader 20 by changing the RF configuration parameter during the signal reception interval. When the NFC device 10 determines that the signal reception operation is regularly or normally performed, the NFC device 10 transmits a response to the input message to the NFC reader 20 (S270) and may perform sequential operations (S290).

Figure 9:
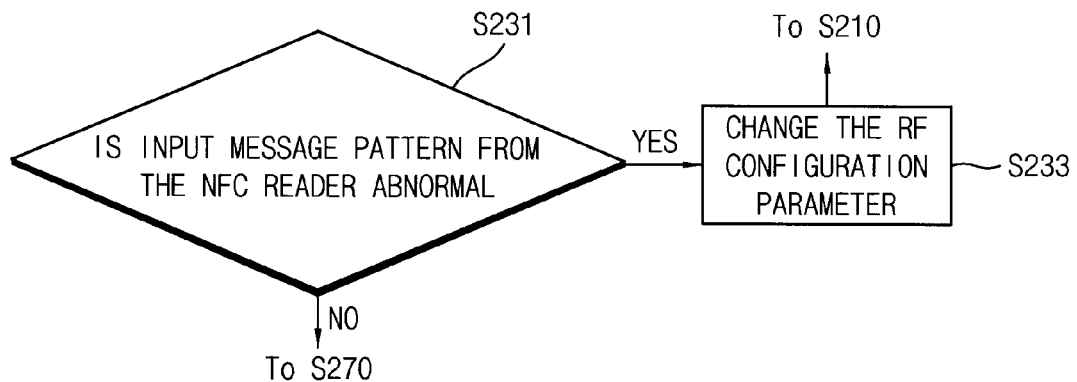
FIG. 9 is a flow chart illustrating a step of determining whether the signal reception operation is normally performed in FIG. 8 according to example embodiments.

FIG. 9 is a flow chart illustrating a step of determining whether the signal reception operation is regularly or normally performed in FIG. 8 according to example embodiments.

Referring to FIG. 9, for determining whether the signal reception operation is regularly or normally performed (S230a), the NFC device 10 determines whether a pattern of the input message from the NFC reader 20 is irregular or abnormal (S231). The NFC device 10 determines that the pattern of the input message is abnormal when an overshoot or an undershoot exists in the pattern of the input message. When the pattern of the input message is abnormal (YES in S231), the NFC chip 200 changes the RF configuration parameter during the signal reception operation (S233) and may receive an input message from the NFC reader 20 again (S210). When the pattern of the input message is normal (NO in S231), the NFC device 10 transmits the response to the input message to the NFC reader 20 (S270).

Figure 10:
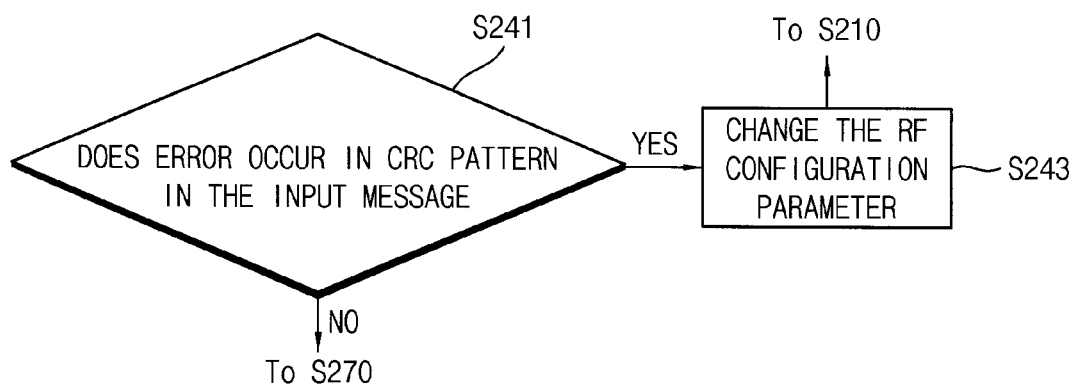
FIG. 10 is a flow chart illustrating a step of determining whether the signal reception operation is normally performed in FIG. 8 according to example embodiments.

FIG. 10 is a flow chart illustrating a step of determining whether the signal reception operation is regularly or normally performed in FIG. 8 according to example embodiments.

Referring to FIG. 10, for determining whether the signal reception operation is normally performed (S230b), the NFC device 10 determines whether an error occurs in a cyclic redundancy check (CRC) pattern in the input message (S241). For determining whether an error occurs in the CRC pattern in the input message, the NFC chip 200 may include a CRC circuit and the CRC circuit may determine whether an error occurs in the CRC pattern. When the error occurs in the CRC pattern (YES in S241), the NFC chip 200 changes the RF configuration parameter during the signal reception operation (S233) and may receive an input message from the NFC reader 20 again (S210). When the error does not occur in the CRC pattern (NO in S241), the NFC device 10 transmits the response to the input message to the NFC reader 20 (S270).

Figure 11:
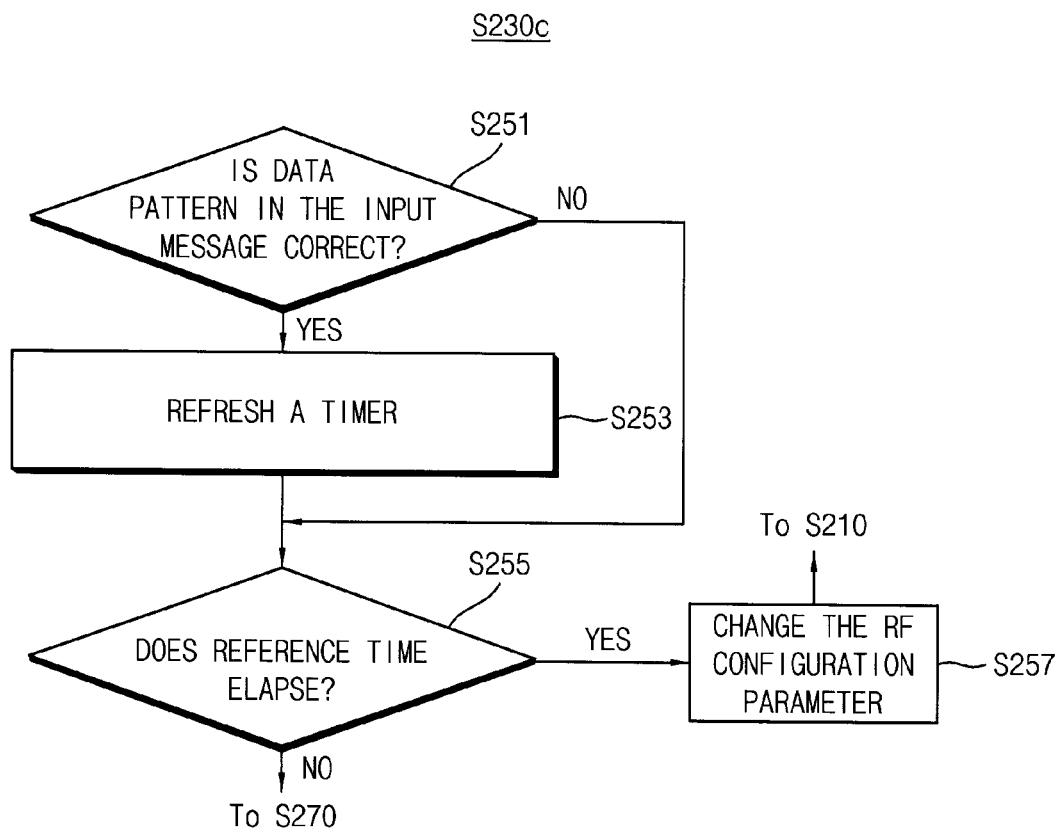
FIG. 11 is a flow chart illustrating a step of determining whether the signal reception operation is normally performed in FIG. 8 according to example embodiments.

FIG. 11 is a flow chart illustrating a step of determining whether the signal reception operation is regularly or normally performed in FIG. 8 according to example embodiments.

Referring to FIG. 11, for determining whether the signal reception operation is normally performed (S230c), the NFC device 10 determines whether a data pattern in the input message is correct (S251). For determining whether the data pattern in the input message is correct, the NFC chip 200 may include a CRC circuit and the CRC circuit may determine whether the data pattern is correct using a CRC pattern. When the data pattern is correct (YES in S251), the NFC chip 200 refreshes an internal timer (S253). The NFC chip determines whether a reference time elapses since the internal timer is refreshed (S255). When the reference time elapses since the internal timer is refreshed (YES in S255), the NFC chip 200 changes the RF configuration parameter during the signal reception operation (S257) and may receive an input message from the NFC reader 20 again (S210). When the reference time does not elapse since the internal timer is refreshed (NO in S255), the NFC device 10 transmits the response to the input message to the NFC reader 20 (S270). When the data pattern is not correct (NO in S251), the NFC chip determines whether a reference time elapses without the refreshing the internal timer.

Figure 12:
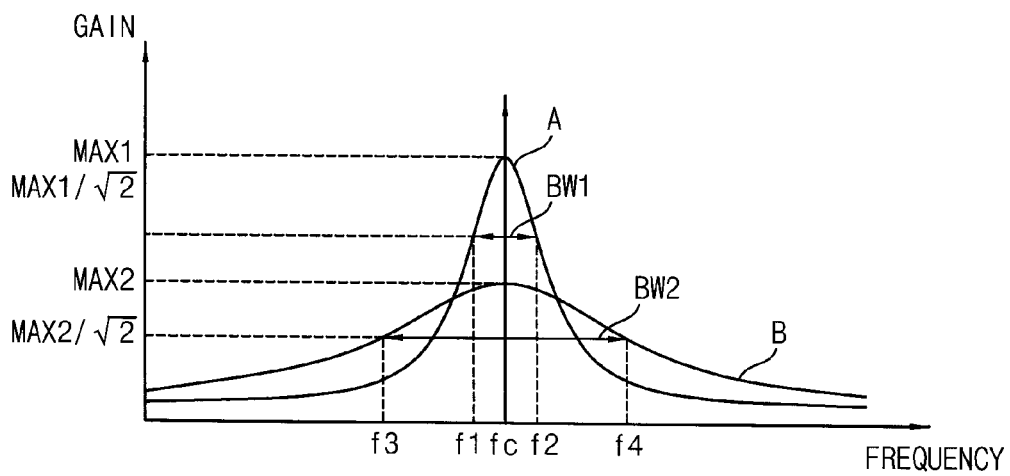
FIG. 12 is a graph to explain the operation of the NFC device of FIG. 1.

FIG. 12 is a graph to explain the operation of the NFC device of FIG. 1. In FIG. 12, a first graph A represents the frequency characteristic of the resonance unit 100.

Referring to FIG. 12, the resonance unit 100 may have the longitudinal frequency characteristic having the center on the carrier frequency fc. The resonance unit 100 may have the maximum gain MAX1 at the carrier frequency fc and may have a first bandwidth BW1 where a first frequency f1 and a second frequency f2 serve as cutoff frequencies. The Q factor of the resonance unit 100 may have a value obtained by dividing the carrier frequency fc by the first bandwidth BW1. As mentioned above, the NFC chip 200 in the NFC device 10 may adaptively change the Q factor of the resonance unit 100 during the signal transmission and/or reception interval in the card mode.

For example, the NFC chip 200 may adaptively change the Q factor of the resonance unit 100 during the signal transmission interval in the card mode based on whether the NFC reader 20 recognizes the response. For example, the NFC chip 200 may adaptively change the Q factor of the resonance unit 100 during the signal reception interval in the card mode based on whether the signal reception operation is normally performed. For example, when the NFC reader 20 does not recognize the response or the signal reception operation is not normally performed in the card mode of the NFC device 10, the NFC chip 200 may change the Q factor of the resonance unit 100 and the resonance unit 100 may have a frequency characteristic represented by a second graph B. The resonance unit 100 may have the maximum gain MAX2 at the carrier frequency fc and may have a second bandwidth BW2 where a third frequency f3 and a fourth frequency f4 serve as cutoff frequencies in the second graph B. Since the Q factor of the resonance unit 100 is decreased, signal depth of the NFC device 10 may be increased.

Figure 13:
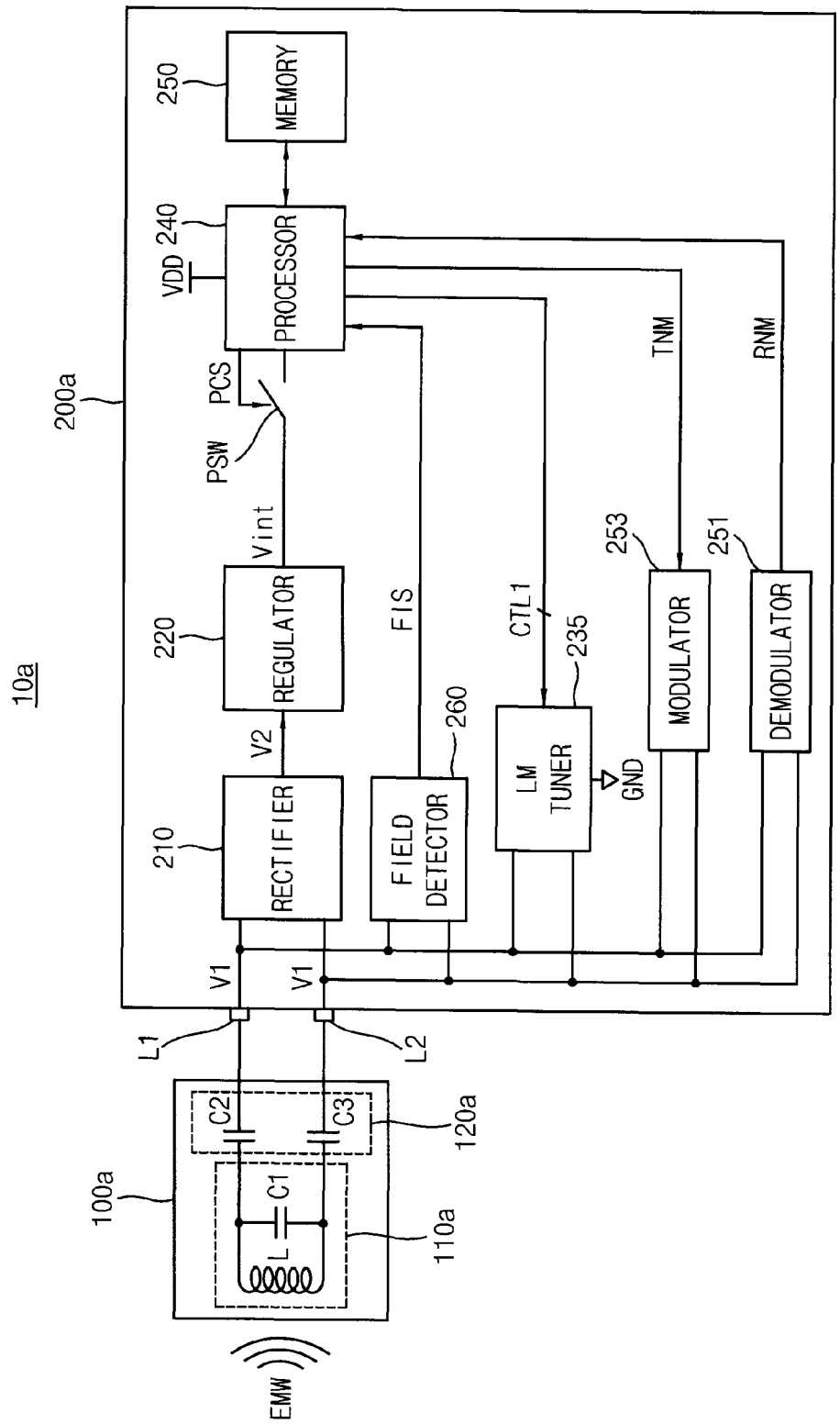
FIG. 13 is a block diagram illustrating an example of the NFC device of FIG. 1 according to example embodiments.

FIG. 13 is a block diagram illustrating an example of the NFC device of FIG. 1 according to example embodiments. Only elements to operate the NFC device 10a in the card mode are illustrated in FIG. 13 and elements to operate the NFC device 10a in the reader mode are omitted in FIG. 13. Referring to FIG. 13, the NFC device 10a may include a resonance unit 100a and an NFC chip 200a. The NFC chip 200a may be connected to the resonance unit 100 through a first power terminal L1 and a second power terminal L2.

The resonance unit 100a may include a resonance circuit 110a having an antenna L and a first capacitor C1 and a filter 120a having a second capacitor C2 and a third capacitor C3 to provide an induction voltage induced in response to the EMW to the first power terminal L1 and the second power terminal L2. The resonance unit 100a may supply the induction voltage induced in response to the EMW to the NFC chip 200a as a first voltage V1 through the filter 120a.

The configuration of the resonance unit 100a illustrated in FIG. 13 is an example only and the configuration of the resonance unit 100a according to example embodiments may not be limited to the above, but may be variously modified.

The NFC chip 200a may receive the first voltage V1 from the resonance unit 100a through the first power terminal L1 and the second power terminal L2. The NFC chip 200a may include a rectifier 210, a regulator 220, a load modulation tuner 235, a processor 240, a power switch PSW, a memory 250, a demodulator 251, a modulator 253 and a field detector 260.

The rectifier 210 may generate a second voltage V2 by rectifying the first voltage V1. The regulator 220 may generate an internal voltage Vint having a voltage level of a predetermined magnitude usable in the NFC chip 200a by using the second voltage V2 and can provide the internal voltage Vint to the power switch PSW.

The processor 240 may control the overall operation of the NFC chip 200a. The processor 240 may operate by receiving a supply voltage VDD from a power source, such as a battery. In addition, the processor 240 may receive the internal voltage Vint through the power switch PSW. When the supply voltage VDD has a predetermined level or more, the processor 240 may operate by using the supply voltage VDD and disable a power control signal PCS to turn off the power switch PSW. Meanwhile, when the supply voltage VDD has a level less than the predetermined level, the processor 240 enables the power control signal PCS to turn on the power switch PSW such that the processor 240 may be operated by using the internal voltage Vint supplied from the regulator 220.

When the signal reception operation is performed in the card mode, the demodulator 251 generates the reception message RNM by demodulating the signal supplied from the resonance unit 100 through the first and second power terminals L1 and L2 to provide the reception message RNM to the processor 240. The processor 240 may store the reception message RNM in the memory 250.

When the signal transmission operation is performed in the card mode, the processor 240 reads out the output data from the memory 250 and encodes the output data to provide a transmission message TNM to the modulator 253 and the modulator 253 may modulate the transmission message TNM to provide a modulation signal to the first and second power terminals L1 and L2. For instance, the modulator 253 may generate the modulation signal by performing load modulation with respect to the transmission message TNM.

The field detector 260 may receive the first voltage V1 from the resonance unit 100 to measure the magnitude of the first voltage V1 and may generate a field intensity signal FIS corresponding to the magnitude of the first voltage V1. As the intensity of the EMW received from the NFC reader 20 becomes strong, the magnitude of the first voltage V1 generated from the resonance unit 100 is increased, so the field intensity signal FIS may represent the intensity of the EMW received from the NFC reader 20. In addition, when the NFC reader 20 recognizes a signal from the NFC device 10a, the intensity of the EMW received from the NFC reader 20 becomes changed. Therefore, the NFC chip 200a may determine whether the signal transmission and/or reception operation is normally performed based on the field intensity signal FIS.

The processor 240 may provide the load modulation tuner 235 with a control signal CTL1 having a plurality of bits indicating a mode and operation of the NFC device 10a based on the field intensity signal FIS, the mode and the operation of the NFC device 10a. The processor 240 may determine whether the NFC reader 20 is near the NFC device 10a and whether the signal transmission and/or reception operation is normally performed based on the field intensity signal FIS.

The load modulation tuner 235 is may be coupled to the first power terminal L1, the second power terminal L2 and a ground voltage. The load modulation tuner 235 may change the RF configuration parameter during the signal transmission or reception interval by selectively connecting a current load or a resistive load between the first power terminal L1 and the ground voltage and/or between the second power terminal L2 and the ground voltage to adjust the RF frequency factor of the NFC device 10a.

Figure 14:
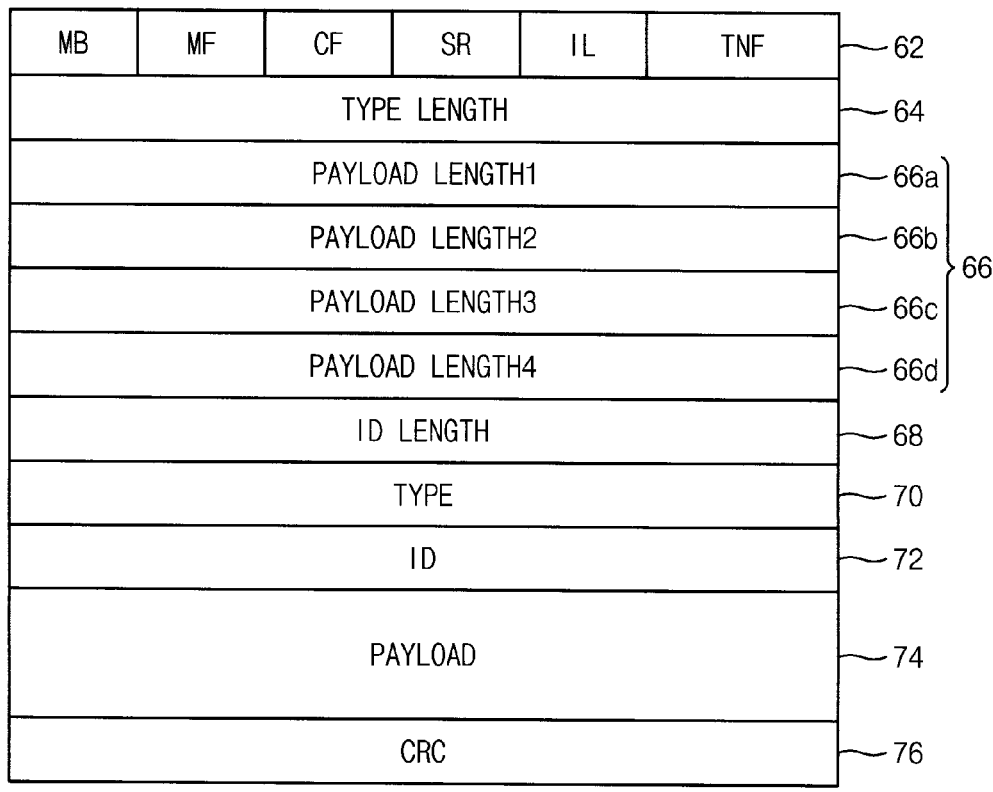
FIG. 14 is a diagram that illustrates formats for the NDEF message according to example embodiments.

FIG. 14 illustrates formats for the NDEF message according to example embodiments. The NFC may exchange data according to various formats for various applications. The NFC forum defines various data formats using a plurality of RTDs. The RTDs may include a Smart Poster, Handover of Configuration information, Web Access, and the like.

In some embodiments, the RTD can be used individually and/or can be part of an NDEF message. The RTD has a plurality of header fields that represent a plurality of information that is associated with data. The plurality of information associated with the data includes control information of a record, a type of data, a payload length of the data, an identity field, and the like. Hence, the plurality of information associated with the context data is stored in a plurality of byte fields, for example a byte field 62, a byte field 64, a byte field 66, a byte field 68, a byte field 70, a byte field 72, a byte field 74 and a byte field 74.

The first byte field 62 represents a first byte that includes control information for the NDEF message associated with the context data. The byte field 62 includes a plurality of information that is included in a plurality of bit fields. Each of the plurality of bit fields signifies specific information associated with the context data. In an embodiment of the present invention, the byte field 62 is divided into six bit fields represented as MB, MF, CF, SR, IL and TNF.

Each of the six bit fields signifies specific information, for example, MB represents Message Begin, ME represents Message End, CF represents Chunk Flag, SR represents Short Record, IL represents ID Length field, TNF represents Type Name Format. The different bit fields can represent different values for representing the data. For example, the TNF can have the value 0x01 or 0x04.

The byte field 64 represents type length of the type field shown in byte field 70. The Payload length byte fields, for example the byte fields 66*a*, 66*b*, 66*c*, and 66*d*, give the length of the context payload that is given in 74. The byte field 68 represents ID length of the data. Hence, the byte field 68 provides the length value of the ID. The byte field 70 represents the Type of the payload.

The byte field 72 represents an ID field. The ID field is used to identify the context. For example, the ID field is used to identify location, user, presence or other sensor data. Further, the byte field 74 represents payload associated with the type of data. The byte field 76 represents CRC pattern of the data.

Figure 15:
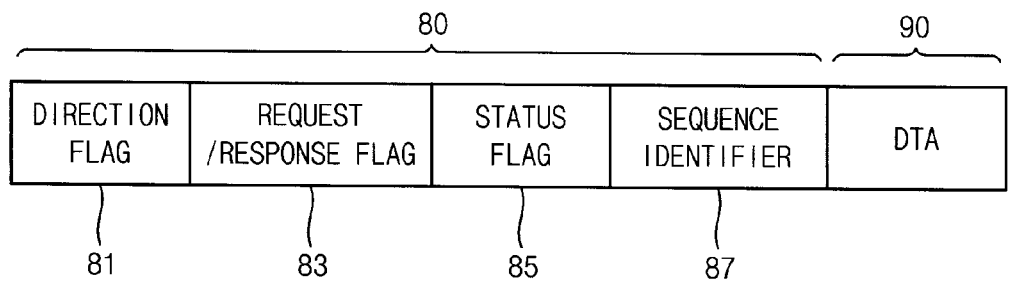
FIG. 15 is a diagram that illustrates an example of the payload field in the NDEF message of FIG. 14.

FIG. 15 illustrates an example of the payload field in the NDEF message of FIG. 14. Referring to FIG. 15, the payload field 74 in the NDEF includes a control field 80 and a data field 90. The control field 80 includes a direction flag field 81, a request/response flag field 83, a status flag field 85, and a sequence identifier field 87. The direction flag field 81 indicates a direction of communication of the NDEF message.

The request/response flag field 83 indicates whether the NDEF format includes a request command or response command. For example, the request/response flag field 83 includes a value '0' when the NDEF message corresponds to a request command and includes a value '1' when the NDEF message corresponds to a response command. The status flag field 85 indicates a communication state of a sender of the NDEF record. The status flag field 85 helps determine the state of the NFC device 10 or the NFC reader 20 during a particular instance of communication.

The sequence identifier field 87 indicates a sequence identifier assigned to each NDEF message communicated between the NFC device 10 and the NFC reader 20. In other words, the sequence identifier field 87 indicates the order in which the NDEF messages are written so that the NDEF messages are not duplicated or missed during communication between the NFC device 10 and the NFC reader 20. The sequence identifier that is exchanged between the NFC device 10 and the NFC reader 20 may be a random number or a sequence of numbers incremented by one. The sequence identifier in the sequence identifier field 87 provides reliability in communication between the NFC device 10 and the NFC reader 20. The data field 90 may include data bits that are exchanged between the NFC device 10 and the NFC reader 20.

Figure 16:
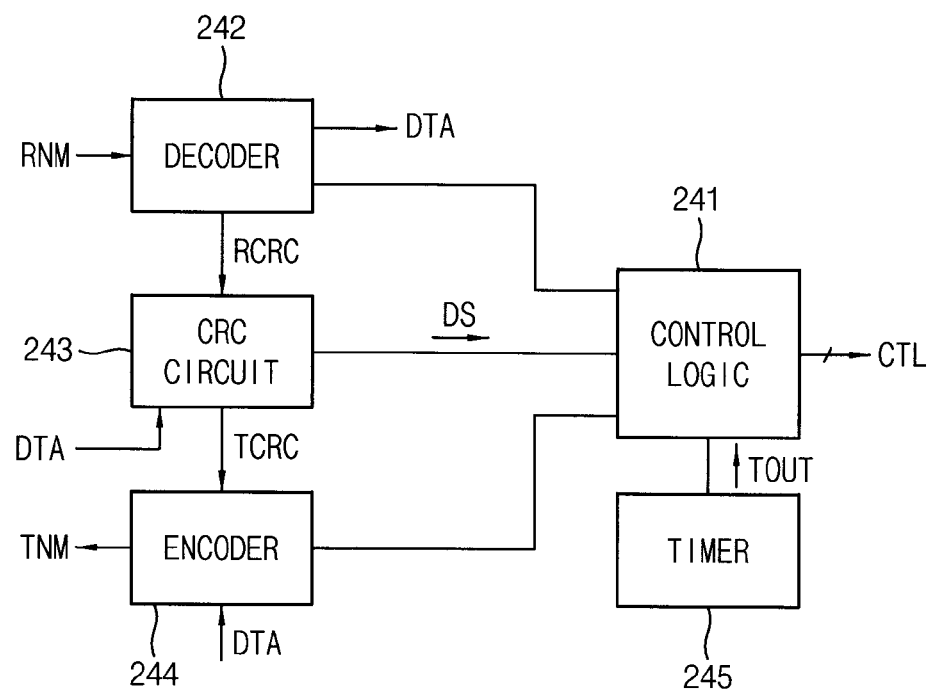
FIG. 16 is a block diagram illustrating an example of the processor in FIG. 13 according to example embodiments.

FIG. 16 is a block diagram illustrating an example of the processor in FIG. 13 according to example embodiments. Referring to FIG. 16, the processor 240 may include a control logic 241, a decoder 242, a CRC circuit 243, an encoder 244 and a timer 245. The control logic 241 may control the decoder 242, the CRC circuit 243, the encoder 244 and the timer 245.

The decoder 241 may decode the reception message RNM, may provide the data pattern DTA to the memory 250 and may provide a received CRC pattern RCRC to the CRC circuit 243. The CRC circuit 243 checks whether an error exists in the received CRC pattern RCRC to provide the control logic 241 with a decision signal DS indicating whether an error exists in the received CRC pattern RCRC. The CRC circuit 243 receives the data pattern DTA from the decoder 242, checks whether the data pattern DTA is correct using the received CRC pattern RCRC and provides the control logic 241 with the decision signal DS indicating whether the data pattern DTA is correct. In the signal transmission operation, the CRC circuit 243 receives the data pattern DTA from the memory 250 and generates a transmission CRC pattern TCRC to be provided to the encoder 244. The encoder 244 encodes the data pattern DTA and the transmission CRC pattern TCRC to generate a transmission message TNM and to provide the transmission message TNM to the demodulator 253. The timer 245 is refreshed by the control logic 241 and provides a time-out signal TOUT to the control logic 241 when a reference time elapses since the timer 245 is refreshed. The timer 245 notifies the control logic 241 of the reference time elapsing using the time-out signal TOUT in the signal transmission or reception operation The control logic 241 may provide the load modulation tuner 235 with the control signal CTL1 that controls the load modulation tuner 235, based on the field intensity signal FIS, the decision signal DS and the time-out signal TOUT.

When the processor 240 receives the NDEF message of FIG. 14 as the reception message RNM, the decoder 242 decodes the payload 74 to provide the control logic 241 with a request flag in the request flag field 83. The control logic 241 may determine whether the first signal is the same as the second signal, based on the request flag as described with reference to FIG. 6. When the NFC device 10*a* transmits the NDEF message of FIG. 14 to the NFC reader 20 as a response to the request, the control logic 241 refreshes the timer 245 as soon as the NFC device 10*a* transmits the NDEF message to the NFC reader 20 and may determine whether the reference time elapses based on the time-out signal TOUT as described with reference to FIG. 5.

When the processor 240 receives the NDEF message of FIG. 14 as the reception message RNM, the decoder 242 provides the received CRC pattern RCRC to the CRC circuit 243 and the CRC circuit 243 determines whether an error exists in the CRC pattern by checking the received CRC pattern RCRC as described with reference to FIG. 10. When the processor 240 receives the NDEF message of FIG. 14 as the reception message RNM, the decoder 242 provides the data pattern DTA to the CRC circuit 243 and the CRC circuit 243 determines whether the data pattern DTA is correct using the CRC pattern as described with reference to FIG. 11.

Figure 17:
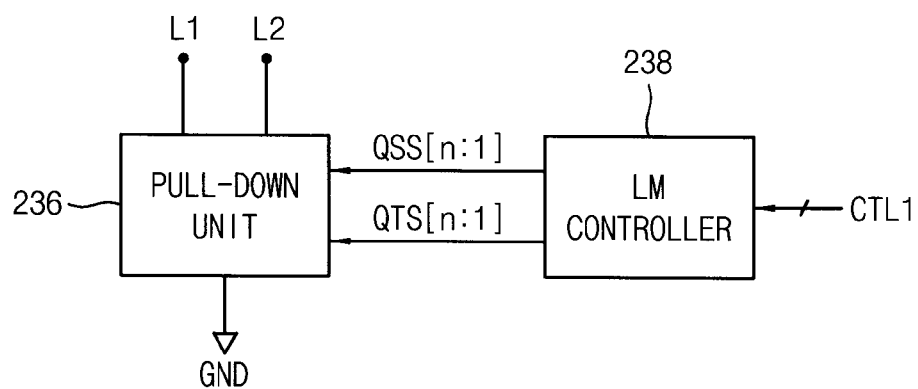
FIG. 17 is a block diagram illustrating an example of the load modulation tuner included in the NFC device of FIG. 13.

FIG. 17 is a block diagram illustrating an example of the load modulation tuner included in the NFC device of FIG. 13. Referring to FIG. 17, the load modulation tuner 235 may include a pull-down unit 236 and a load modulation controller 238.

The load modulation controller 238 may generate a Q sink signal QSS[n:1] and a tuning signal QTS[n:1] based on the control signal CTL1 from the processor 240. Here, n is a natural number greater than two. The pull-down unit 263 may selectively connect or disconnect a current load or a resistive load between the first power terminal L1, the second power terminal L2 and the ground voltage based on the Q sink signal QSS[n:1] and the tuning signal QTS[n:1].

Figure 18:
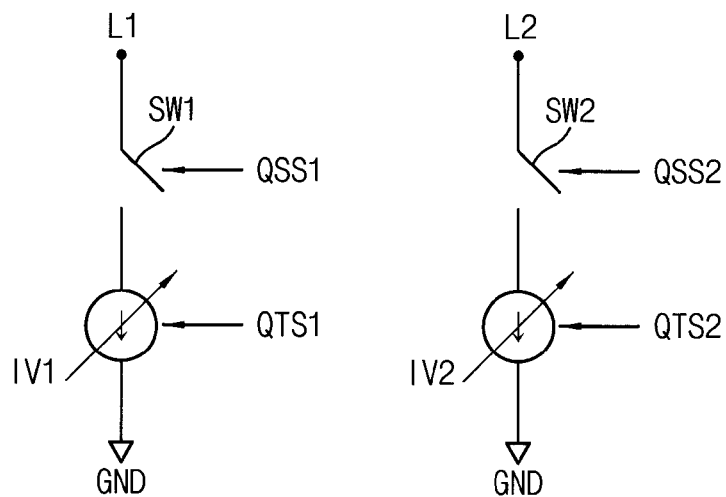
FIG. 18 is a diagram illustrating an example of the pull-down unit included in the load modulation tuner of FIG. 17.

FIG. 18 is a diagram illustrating an example of the pull-down unit included in the load modulation tuner of FIG.

17. Referring to FIG. 18, a pull-down unit 263a may include switches SW1 and SW2 and variable current sources IV1 and IV2.

The switch SW1 may be connected between the first power terminal L1 and the variable current source IV1, and the variable current source IV1 may be connected between the switch SW1 and the ground voltage GND. The switch SW2 may be connected between the second power terminal L2 and the variable current source IV2, and the variable current source IV2 may be connected between the switch SW2 and the ground voltage GND.

The switch SW1 may be turned on when the Q sink signal QSS1 is enabled and turned off when the Q sink signal QSS1 is disabled. The switch SW2 may be turned on when the Q sink signal QSS2 is enabled and turned off when the Q sink signal QSS2 is disabled.

The variable current source IV1 may generate a current having a magnitude corresponding to a magnitude of the tuning signal QTS1. The variable current source IV2 may generate a current having a magnitude corresponding to a magnitude of the tuning signal QTS2.

As illustrated in FIG. 18, the pull-down unit 236a may selectively change the RF configuration parameter of the resonance unit 100a by connecting a current load between the first power terminal L1 and the ground voltage GND and between the second power terminal L2 and the ground voltage GND and by adjusting the magnitude of the current load based on the tuning signal QTS.

Figure 19:
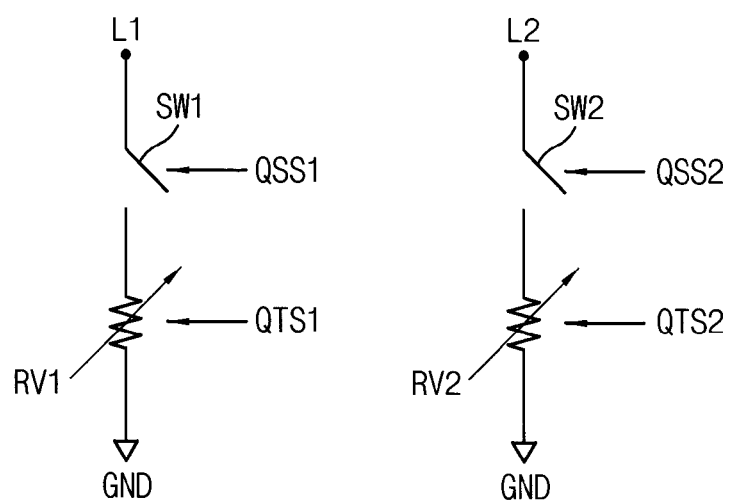
FIG. 19 is a diagram illustrating another example of the pull-down unit included in the load modulation tuner of FIG. 17.

FIG. 19 is a diagram illustrating another example of the pull-down unit included in the load modulation tuner of FIG. 17. Referring to FIG. 19, a pull-down unit 263b may include switches SW1 and SW2 and variable resistors RV1 and RV2.

The switch SW1 may be connected between the first power terminal L1 and the variable resistor RV1, and the variable resistor RV1 may be connected between the switch SW1 and the ground voltage GND. The switch SW2 may be connected between the second power terminal L2 and the variable resistor RV2, and the variable resistor RV2 may be connected between the switch SW2 and the ground voltage GND.

The switch SW1 may be turned on when the Q sink signal QSS1 is enabled and turned off when the Q sink signal QSS1 is disabled. The switch SW2 may be turned on when the Q sink signal QSS2 is enabled and turned off when the Q sink signal QSS2 is disabled.

The variable resistor RV1 may have a resistance corresponding to a magnitude of the tuning signal QTS1. The variable resistor RV2 may have a resistance corresponding to a magnitude of the tuning signal QTS2.

As illustrated in FIG. 19, the pull-down unit 236b may change the RF configuration parameter of the resonance unit 100a by selectively connecting a resistive load between the first power terminal L1 and the ground voltage GND and between the second power terminal L2 and the ground voltage GND, and by adjusting the magnitude of the resistive load based on the tuning signal QTS.

Figure 20:
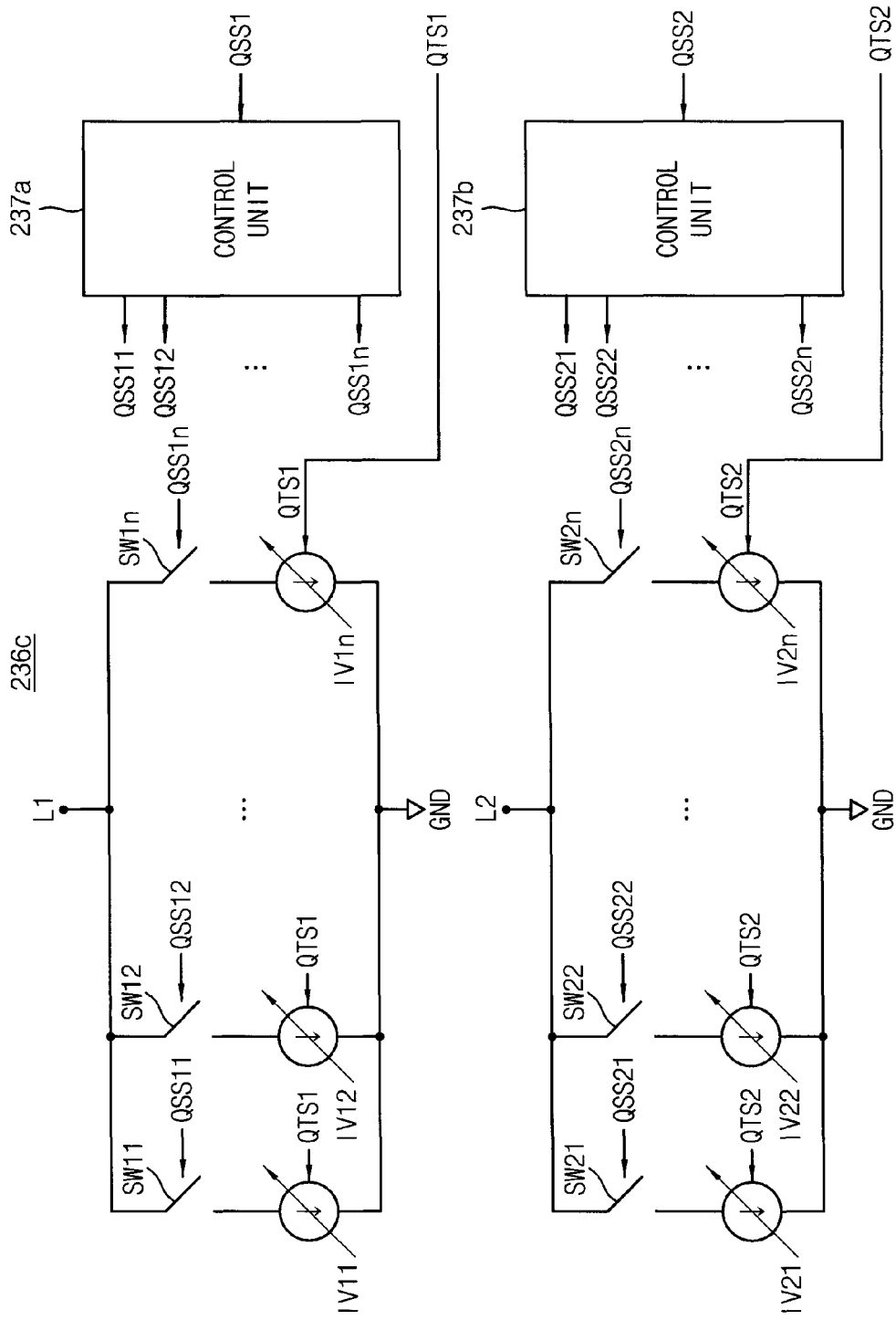
FIG. 20 is a block diagram illustrating another example of the load modulation tuner included in the NFC device of FIG. 13.

FIG. 20 is a block diagram illustrating another example of the load modulation tuner included in the NFC device of FIG. 13. Referring to FIG. 20, the pull-down unit 236c may include a control unit 237a, first to $n^{th}$ switches SW11, SW12, . . . , and SW1n, first to $n^{th}$ variable current sources IV11, IV12, . . . , and IV1n, a control unit 237b, first to $n^{th}$ switches SW21, SW22, . . . , and SW2n and first to $n^{th}$ variable current sources IV21, IV22, . . . , and IV2n wherein n is an integer of 2 or more.

The control unit 237a may generate first to $n^{th}$ Q sink sub-signals QSS11, QSS12, . . . , and QSS1n, which are sequentially enabled, when the Q sink signal QSS1 is enabled and may generate first to $n^{th}$ Q sink sub-signals QSS11, QSS12, . . . , and QSS1n, which are sequentially disabled, when the Q sink signal QSS1 is disabled.

The first to $n^{th}$ switches SW11, SW12, . . . , and SW1n are connected in parallel to the first power terminal L1, the first to $n^{th}$ variable current sources IV11, IV12, . . . , and IV1n are connected in parallel to the ground voltage GND, and the first to $n^{th}$ switches SW11, SW12, . . . , and SW1n as well as the first to $n^{th}$ variable current sources IV11, IV12, . . . , and IV1n are connected with each other in series, respectively.

The first to $n^{th}$ switches SW11, SW12, . . . , and SW1n may be turned on when the first to $n^{th}$ Q sink sub-signals QSS11, QSS12, . . . , and QSS1n are enabled, respectively, and may be turned off when the first to $n^{th}$ Q sink sub-signals QSS11, QSS12, . . . , and QSS1n are disabled, respectively. The first to $n^{th}$ variable current sources IV11, IV12, . . . , and IV1n may generate the current having a magnitude corresponding to the magnitude of the tuning signal QTS1.

The control unit 237b may generate first to $n^{th}$ Q sink sub-signals QSS21, QSS22, . . . , and QSS2n, which are sequentially enabled, when the Q sink signal QSS2 is enabled and may generate first to $n^{th}$ Q sink sub-signals QSS21, QSS22, . . . , and QSS2n, which are sequentially disabled, when the Q sink signal QSS2 is disabled.

The first to $n^{th}$ switches SW21, SW22, . . . , and SW2n are connected in parallel to the second power terminal L2, the first to $n^{th}$ variable current sources IV21, IV22, . . . , and IV2n are connected in parallel to the ground voltage GND, and the first to $n^{th}$ switches SW21, SW22, . . . , and SW2n as well as the first to $n^{th}$ variable current sources IV21, IV22, . . . , and IV2n are connected with each other in series, respectively.

The first to $n^{th}$ switches SW21, SW22, . . . , and SW2n may be turned on when the first to $n^{th}$ Q sink sub-signals QSS21, QSS22, . . . , and QSS2n are enabled, respectively, and may be turned off when the first to $n^{th}$ Q sink sub-signals QSS21, QSS22, . . . , and QSS2n are disabled, respectively. The first to $n^{th}$ variable current sources IV21, IV22, . . . , and IV2n may generate the current having a magnitude corresponding to the magnitude of the tuning signal QTS2.

As illustrated in FIG. 20, the pull-down unit 236c may change the RF configuration parameter of the resonance unit 100a by selectively connecting current loads between the first power terminal L1 and the ground voltage GND and between the second power terminal L2 and the ground voltage GND, and by adjusting the magnitude of the current loads based on the tuning signals QTS1 and QTS2.

Figure 21:
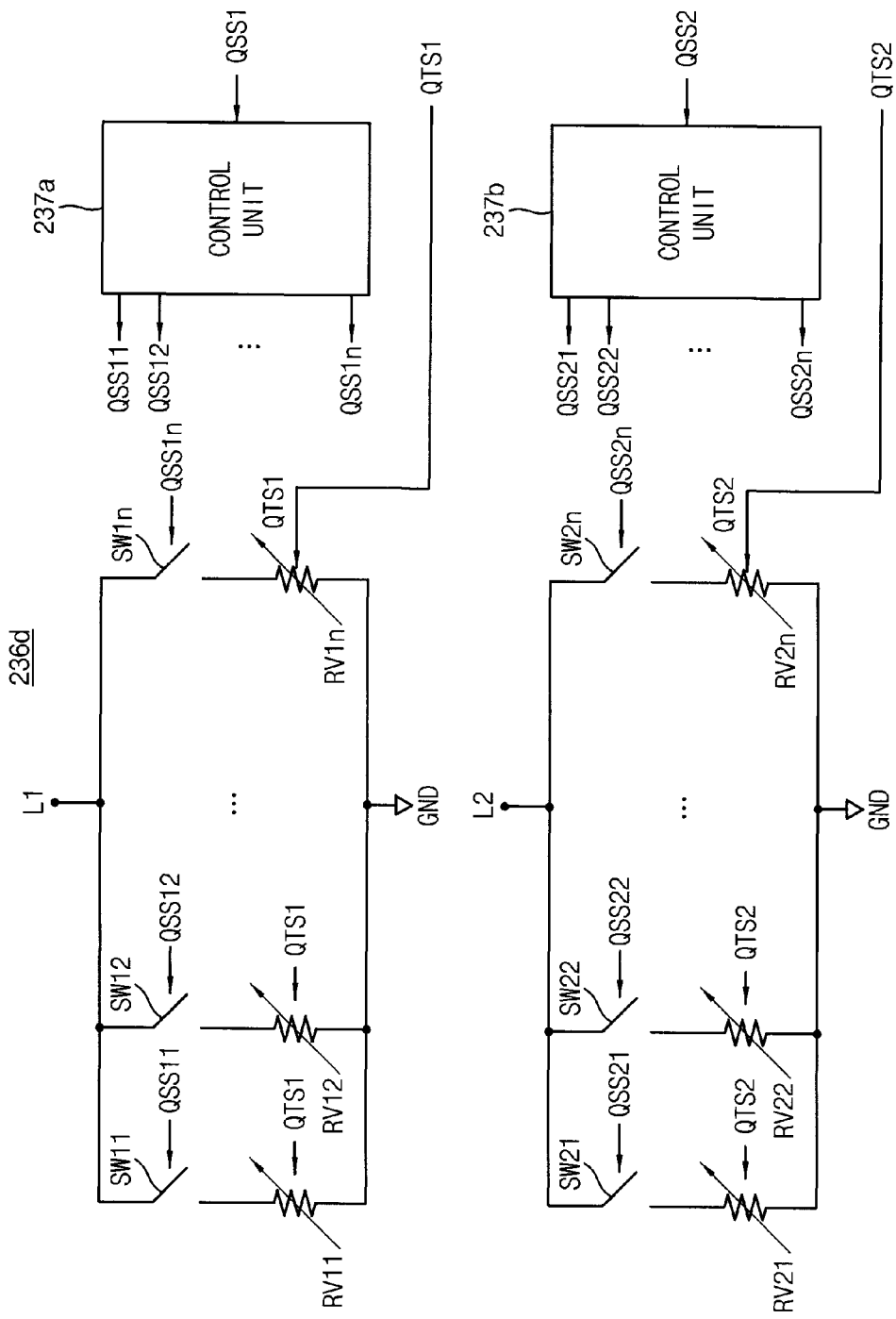
FIG. 21 is a block diagram illustrating another example of the load modulation tuner included in the NFC device of FIG. 13.

FIG. 21 is a block diagram illustrating another example of the load modulation tuner included in the NFC device of FIG. 13. Referring to FIG. 21, the pull-down unit 236d may include a control unit 237a, first to $n^{th}$ switches SW11, SW12, . . . , and SW1n, first to $n^{th}$ variable resistors RV11, RV12, . . . , and RV1n, a control unit 237b, first to $n^{th}$ switches SW21, SW22, . . . , and SW2n and first to $n^{th}$ variable resistors RV21, RV22, . . . , and RV2n wherein n is an integer of 2 or more.

The control unit 237a may generate first to $n^{th}$ Q sink sub-signals QSS11, QSS12, . . . , and QSS1n, which are sequentially enabled, when the Q sink signal QSS1 is enabled and may generate first to $n^{th}$ Q sink sub-signals QSS11, QSS12, . . . , and QSS1n, which are sequentially disabled, when the Q sink signal QSS1 is disabled.

The first to $n^{th}$ switches SW11, SW12, . . . , and SW1n are connected in parallel to the first power terminal L1, the first to $n^{th}$ variable resistors RV11, RV12, . . . , and RV1n are connected in parallel to the ground voltage GND, and the first to n$^{th}$ switches SW11, SW12, . . . , and SW1n as well as the first to n$^{th}$ variable resistors RV11, RV12, . . . , and RV1n are connected with each other in series, respectively.

The first to n$^{th}$ switches SW11, SW12, . . . , and SW1n may be turned on when the first to n$^{th}$ Q sink sub-signals QSS11, QSS12, . . . , and QSS1n are enabled, respectively, and may be turned off when the first to n$^{th}$ Q sink sub-signals QSS11, QSS12, . . . , and QSS1n are disabled, respectively. The first to n$^{th}$ variable resistors RV11, RV12, . . . , and RV1n may have a resistance corresponding to the magnitude of the tuning signal QTS1. Control unit 237b, first to n$^{th}$ switches SW21, SW22, . . . , and SW2n and first to n$^{th}$ variable resistors RV21, RV22, . . . , and RV2n are configured and function in a similar manner responsive to the Q sink signal QSS2 and the tuning signal QTS2, control unit 237b providing first to n$^{th}$ Q sink sub-signals QSS21, QSS22, . . . , and QSS2n.

As illustrated in FIG. 21, the pull-down unit 236d may change the RF configuration parameter of the resonance unit 100a by selectively connecting resistive loads between the first power terminal L1 and the ground voltage GND and between the second power terminal L2 and the ground voltage GND, and by adjusting resistance of the resistive loads based on the tuning signals QTS1 and QTS2.

Figure 22:
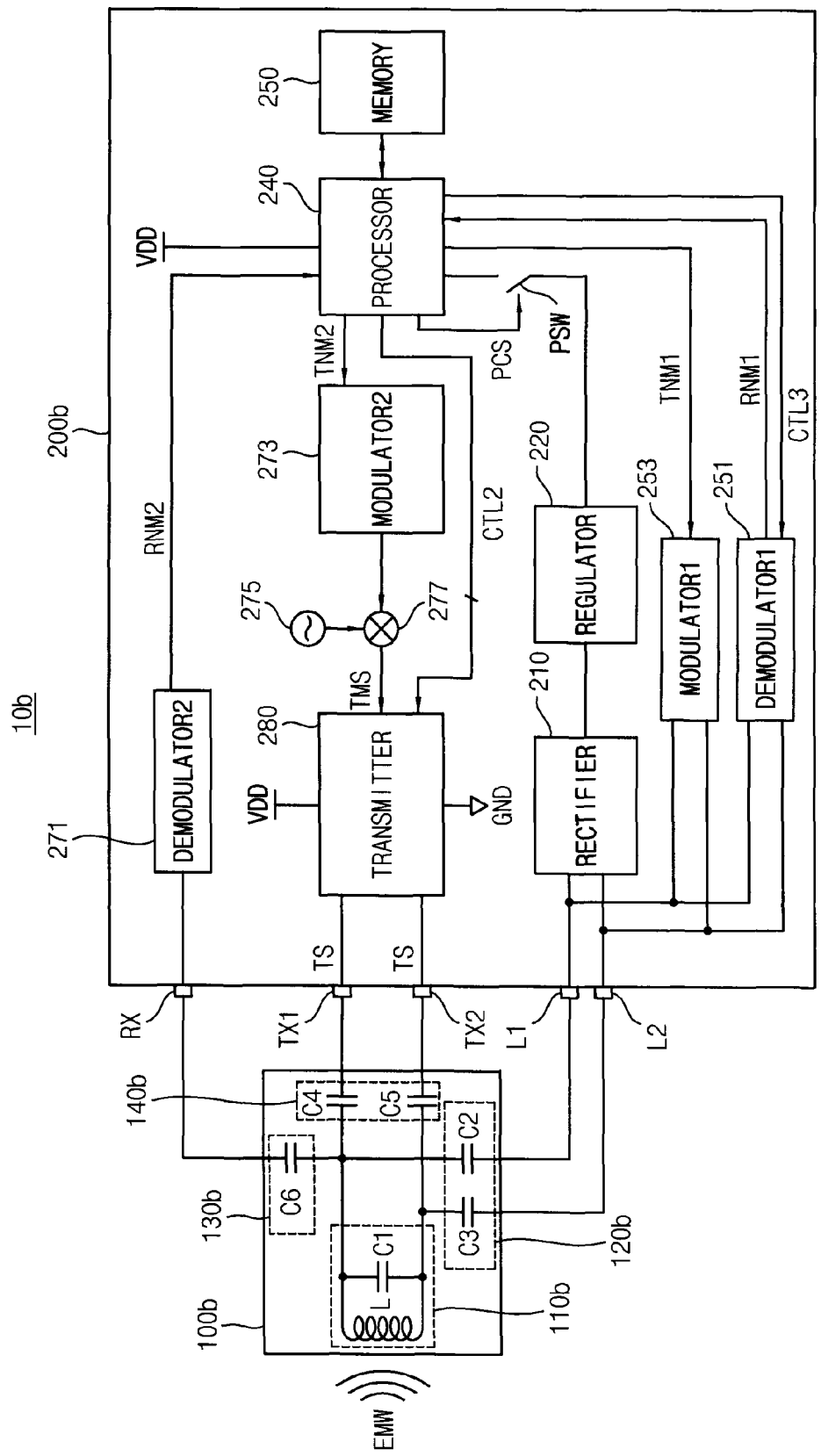
FIG. 22 is a block diagram illustrating another example of the NFC device of FIG. 1.

FIG. 22 is a block diagram illustrating another example of the NFC device of FIG. 1. Elements used to operate the NFC device 10b in the reader mode as well as elements used to operate the NFC device 10b in the card mode are illustrated in FIG. 22.

Referring to FIG. 22, the NFC device 10b may include a resonance unit 100b and an NFC chip 200b. The NFC chip 200b may be connected to the resonance unit 100b through a first power terminal L1, a second power terminal L2, a first transmission terminal TX1, a second transmission terminal TX2, and a reception terminal RX.

The resonance unit 100b may include a resonance circuit 110b having an antenna L and a first capacitor C1, a first filter 120b having a second capacitor C2 and a third capacitor C3 to connect the resonance circuit 110b to the first and second power terminals L1 and L2, a second filter 130b having a sixth capacitor C6 to connect the resonance circuit 110b to the reception terminal RX, and a matching unit 140b including a fourth capacitor C4 and a fifth capacitor C5 to connect the resonance circuit 110b to the first transmission terminal TX1 and the second transmission terminal TX2 to perform the impedance matching.

The configuration of the resonance unit 100b illustrated in FIG. 22 is an example only and the configuration of the resonance unit 100b according to example embodiments may not be limited to the above, but may be variously modified.

The NFC chip 200b may perform the signal transmission operation and the signal reception operation through the first power terminal L1 and the second power terminal L2 in the card mode, perform the signal transmission operation through the first transmission terminal TX1 and the second transmission terminal TX2 in the reader mode, and perform the signal reception operation through the reception terminal RX in the reader mode.

The NFC chip 200b may include a rectifier 210, a regulator 220, a processor 240, a power switch PSW, a memory 250, a first demodulator 251, a first modulator 253, a second demodulator 271, a second modulator 273, an oscillator 275, a mixer 277 and a transmitter 280.

The rectifier 210, the regulator 220, the power switch PSW, the first demodulator 251 and the first modulator 253 can be equivalent to the rectifier 210, the regulator 220, the power switch PSW, the demodulator 251 and the modulator 253 included in the NFC device 10a of FIG. 13.

When the signal reception operation is performed in the card mode, the first demodulator 251 generates a first reception message RNM1 by demodulating the signal supplied from the resonance unit 100b through the first and second power terminals L1 and L2 to provide the first reception message RNM1 to the processor 240. The processor 240 may store some or all of the first reception message RNM1 in the memory 250.

When the signal transmission operation is performed in the card mode, the processor 240 may read out the output data from the memory 250 and encodes the output data to provide a first transmission message TNM1 to the first modulator 253 and the first modulator 253 modulates the first transmission message TNM1 to provide a modulation signal to the first and second power terminals L1 and L2.

When the signal reception operation is performed in the reader mode, the second demodulator 271 generates a second reception message RNM2 by demodulating the signal supplied from the resonance unit 100 through the receive terminal RX to provide the second reception message RNM2 to the processor 240. The processor 240 may store the second reception message RNM2 in the memory 250.

When the signal transmission operation is performed in the reader mode, the processor 240 may read out the output data from the memory 250 and encode the output data to provide a second transmission message TNM2 to the second modulator 273, the second modulator 273 may modulate the second transmission message TNM2 to generate a modulation signal, the oscillator 275 may generate a carrier signal having a frequency corresponding to a carrier frequency (for instance, 13.56 MHz), and the mixer 277 may generate a transmission modulation signal TMS by synthesizing the carrier signal with the modulation signal.

The transmitter 280 may be connected between the supply voltage VDD and the ground voltage GND.

The transmitter 280 may receive the transmit modulation signal TMS from the mixer 277 to generate a transmission signal TS corresponding to the transmission modulation signal TMS in the reader mode. The resonance unit 100b may generate the EMW corresponding to the transmission signal TS supplied from the transmitter 280 through the first transmit terminal TX1 and the second transmit terminal TX2. For instance, in the reader mode, the transmitter 280 may connect the first transmission terminal TX1 and the second transmission terminal TX2 to the supply voltage VDD through a pull-up load or connect the first transmit terminal TX1 and the second transmission terminal TX2 to the ground voltage GND through a pull-down load based on the transmission modulation signal TMS so that the transmission signal TS may be generated from the first transmission terminal TX1 and the second transmission terminal TX2.

The transmitter 280 may change the Q factor of the resonance unit 100b in the signal transmission operation or the signal reception operation in the card mode. For example, the transmitter 280 may change the Q factor of the resonance unit 100b in the signal transmission operation or the signal reception operation in the card mode by selectively connecting the first transmission terminal TX1 and the second transmission terminal TX2 to the ground voltage GND through a pull-down load.

The processor 240 may provide the transmitter 280 with a control signal CTL2 having a plurality of bits indicating a mode and operation of the NFC device 10b based on the mode and the operation of the NFC device 10b. The processor 240 may provide the first demodulator 251 with a control signal CTL3 having a plurality of bits indicating a mode and operation of the NFC device 10b based on the mode and the operation of the NFC device 10b.

The first demodulator 251 may change the RF configuration parameter by adjusting the intensity of amplification of the signal when the first demodulator 251 amplifies the signal provided from the resonance unit 100b through the first and second power terminals L1 and L2 during the signal reception operation in the card mode.

Figure 23:
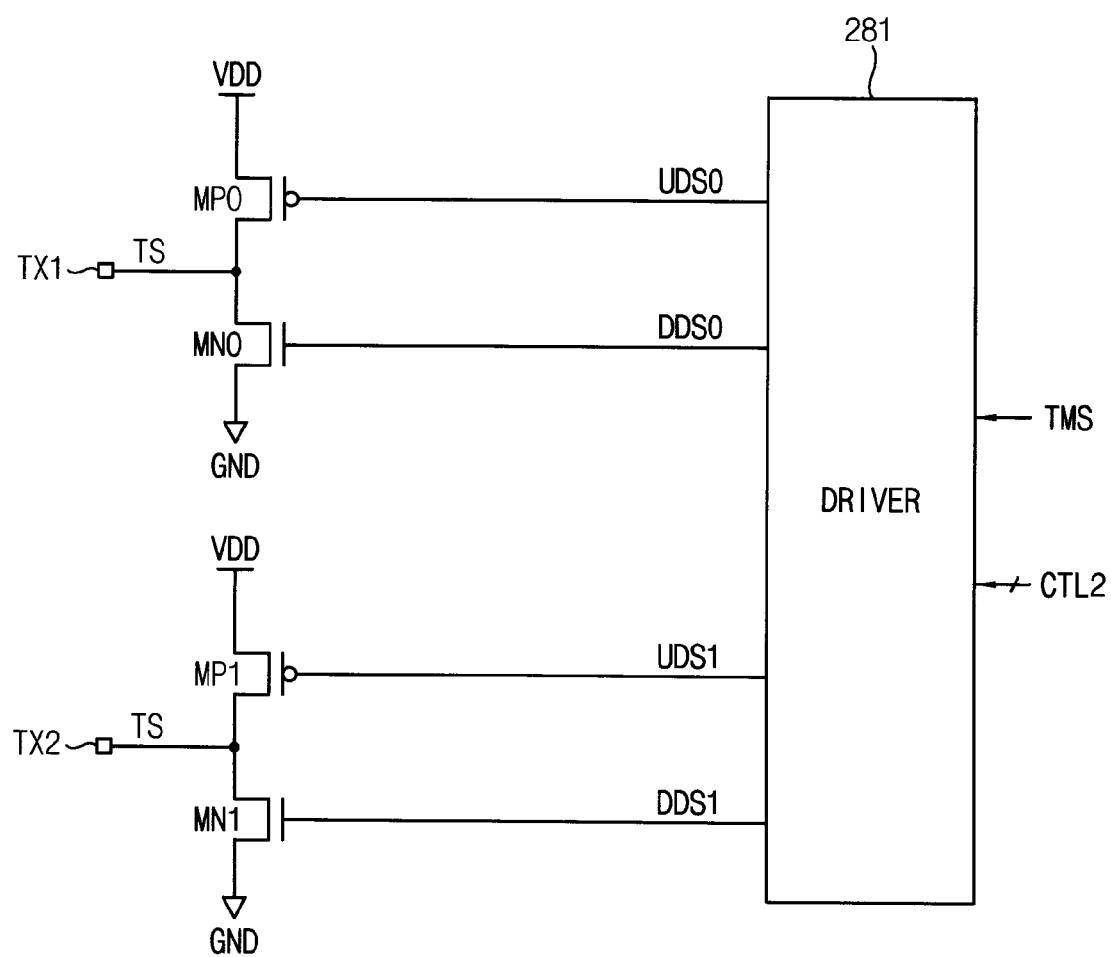
FIG. 23 is a block diagram illustrating an example of the transmitter included in the NFC device of FIG. 22.

FIG. 23 is a block diagram illustrating an example of the transmitter included in the NFC device of FIG. 22. Referring to FIG. 23, a transmitter 280a may include a first pull-up transistor MP0, a second pull-up transistor MP1, a first pull-down transistor MN0, a second pull-down transistor MN1 and a driver 281.

The first pull-up transistor MP0 and the second pull-up transistor MP1 may be p-channel metal oxide semiconductor (PMOS) transistors and the first pull-down transistor MN0 and the second pull-down transistor MN1 may be n-channel metal oxide semiconductor (NMOS) transistors.

The first pull-up transistor MP0 may be connected between the supply voltage VDD and the first transmission terminal TX1 and the first pull-down transistor MN0 may be connected between the first transmission terminal TX1 and the ground voltage GND. The second pull-up transistor MP1 may be connected between the supply voltage VDD and the second transmission terminal TX2 and the second pull-down transistor MN1 may be connected between the second transmission terminal TX2 and the ground voltage GND.

The driver 281 may drive the first pull-up transistor MP0 through a first pull-up driving signal UDS0, may drive the first pull-down transistor MN0 through a first pull-down driving signal DDS0, may drive the second pull-up transistor MP1 through a second pull-up driving signal UDS1, and may drive the second pull-down transistor MN1 through a second pull-down driving signal DDS1.

The driver 281 may determine whether the NFC chip 200b is in the card mode or the reader mode and may determine the signal reception operation or the signal transmission operation when the mode is the card mode based on the control signal CTL2 supplied from the processor 240. In addition, the driver 281 may determine whether to change the Q factor of the resonance unit 100b based on the control signal CTL2 supplied from the processor 240.

The driver 281 may selectively turn on one of the first pull-up transistor MP0 and the first pull-down transistor MN0 and one of the second pull-up transistor MP1 and the second pull-down transistor MN1 based on the transmission modulation signal TMS in the reader mode. The driver 281 may selectively turn on the first pull-down transistor MN0 and the second pull-down transistor MN1 based on the control signal CTL2 when the signal reception operation or the signal transmission operation is performed in the card mode.

As described above, the transmitter 280a drives the first pull-up transistor MP0, the second pull-up transistor MP1, the first pull-down transistor MN0 and the second pull-down transistor MN1 based on the transmission modulation signal TMS in the reader mode to perform the normal operation to provide the transmission modulation signal TMS to the resonance unit 100b. In addition, the transmitter 280a connects the first transmission terminal TX1 and the second transmission terminal TX2 to the ground voltage GND through the first pull-down transistor MN0 and the second pull-down transistor MN1, respectively, thereby changing the Q factor of the resonance unit 100b when the signal reception operation or the signal transmission operation is performed in the card mode.

Figure 24:
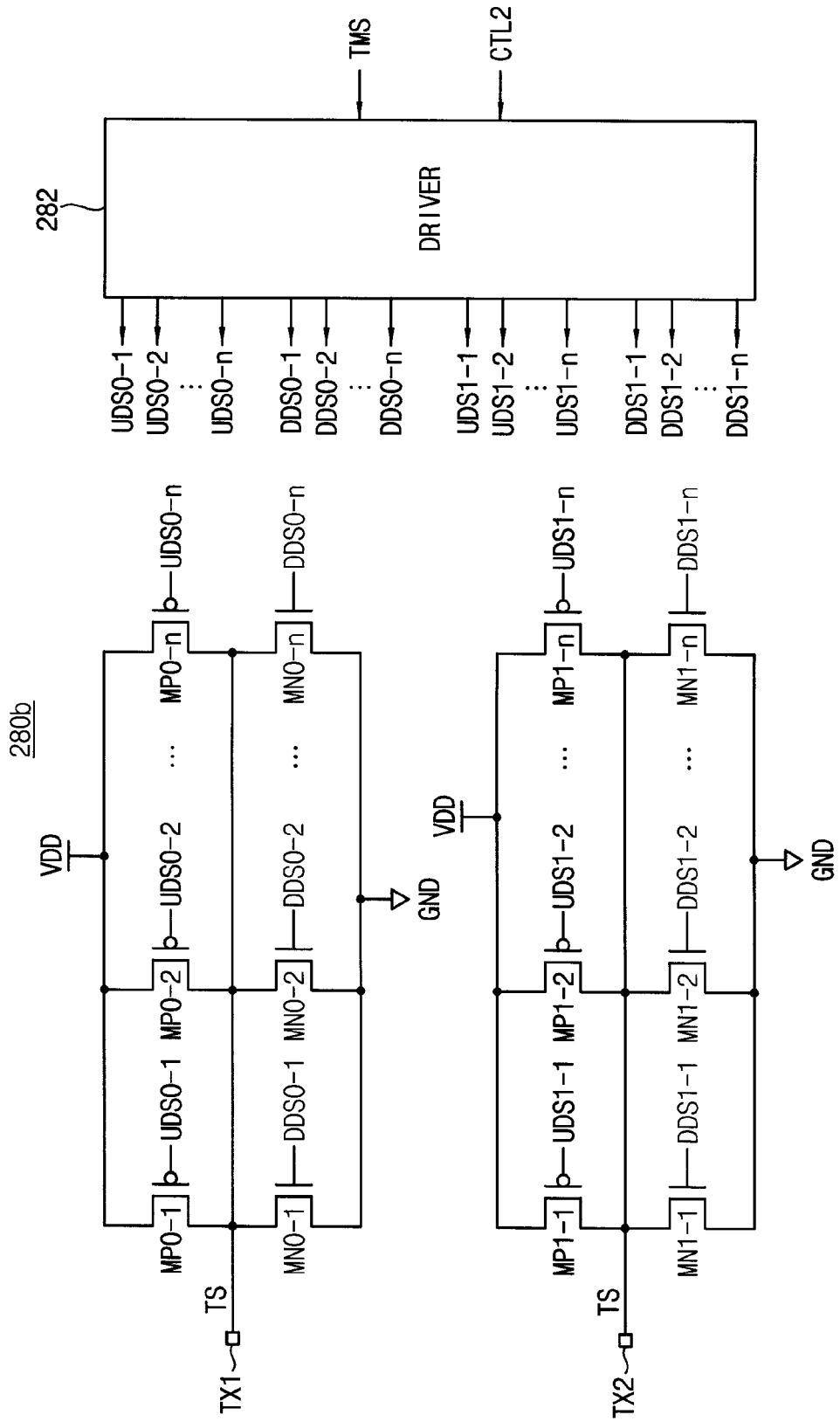
FIG. 24 is a block diagram illustrating another example of the transmitter included in the NFC device of FIG. 22.

FIG. 24 is a block diagram illustrating another example of the transmitter included in the NFC device of FIG. 22. Referring to FIG. 24, the transmitter 280b may include $(1\text{-}1)^{th}$ to $(1\text{-}n)^{th}$ pull-up transistors MP0-1, MP0-2, ..., and MP0-$n$, second-1 to second-n pull-up transistors MP1-1, MP1-2, ..., and MP1-$n$, $(1\text{-}1)^{th}$ to $(1\text{-}n)^{th}$ pull-down transistors MN0-1, MN0-2, ..., and MN0-$n$, second-1 to second-n pull-down transistors MN1-1, MN1-2, ..., and MN1-$n$, and a driver 282.

The $(1\text{-}1)^{th}$ to $(1\text{-}n)^{th}$ pull-up transistors MP0-1, MP0-2, ..., and MP0-$n$ and the second-1 to second-n pull-up transistors MP1-1, MP1-2, ..., and MP1-$n$ may be PMOS transistors, and the $(1\text{-}1)^{th}$ to $(1\text{-}n)^{th}$ pull-down transistors MN0-1, MN0-2, ..., and MN0-$n$ and the second-1 to second-n pull-down transistors MN1-1, MN1-2, ..., and MN1-$n$ may be the NMOS transistors.

The $(1\text{-}1)^{th}$ to $(1\text{-}n)^{th}$ pull-up transistors MP0-1, MP0-2, ..., and MP0-$n$ may be connected in parallel between the supply voltage VDD and the first transmit terminal TX1, and the $(1\text{-}1)^{th}$ to $(1\text{-}n)^{th}$ pull-down transistors MN0-1, MN0-2, ..., and MN0-$n$ may be connected in parallel between the first transmit terminal TX1 and the ground voltage GND.

The second-n pull-up transistors MP1-1, MP1-2, ..., and MP1-$n$ may be connected in parallel between the supply voltage VDD and the second transmit terminal TX2 and the second-1 to second-n pull-down transistors MN1-1, MN1-2, ..., and MN1-$n$ may be connected in parallel between the second transmit terminal TX2 and the ground voltage GND.

The driver 282 may drive the $(1\text{-}1)^{th}$ to $(1\text{-}n)^{th}$ pull-up transistors MP0-1, MP0-2, ..., and MP0-$n$ through $(1\text{-}1)^{th}$ to $(1\text{-}n)^{th}$ pull-up driving signals UDS0-1, UDS0-2, ..., and UDS0-$n$, respectively, drive the $(1\text{-}1)^{th}$ to $(1\text{-}n)^{th}$ pull-down transistors MN0-1, MN0-2, ..., and MN0-$n$ through $(1\text{-}1)^{th}$ to $(1\text{-}n)^{th}$ pull-down driving signals DDS0-1, DDS0-2, ..., and DDS0-$n$, respectively, drive the second-n pull-up transistors MP1-1, MP1-2, ..., and MP1-$n$ through second-1 to second-n pull-up driving signals UDS1-1, UDS1-2, ..., and UDS1-$n$, respectively, and drive the second-1 to second-n pull-down transistors MN1-1, MN1-2, ..., and MN1-$n$ through second-1 to second-n pull-down driving signals DDS1-1, DDS1-2, ..., and DDS1-$n$, respectively.

The driver 282 may determine whether the NFC chip 200b is in the card mode or the reader mode and may determine the signal reception operation or the signal transmission operation when the mode is the card mode based on the control signal CTL2 supplied from the processor 240. In addition, the driver 282 may determine whether to change the Q factor of the resonance unit 100b based on the control signal CTL2 supplied from the processor 240.

In the reader mode, the driver 282 may turn on the $(1\text{-}1)^{th}$ to $(1\text{-}n)^{th}$ pull-up transistors MP0-1, MP0-2, ..., and MP0-$n$ or the $(1\text{-}1)^{th}$ to $(1\text{-}n)^{th}$ pull-down transistors MN0-1, MN0-2, ..., and MN0-$n$ and may turn on the second-n pull-up transistors MP1-1, MP1-2, ..., and MP1-$n$ or the second-1 to second-n pull-down transistors MN1-1, MN1-2, ..., and MN1-$n$ based on the transmit modulation signal TMS.

In the card mode, the driver 282 generates the $(1\text{-}1)^{th}$ to $(1\text{-}n)^{th}$ pull-up driving signals UDS0-1, UDS0-2, ..., and UDS0-$n$ and the second-1 to second-n pull-up driving signals UDS1-1, UDS1-2, ..., and UDS1-$n$ having the logic high level, so the driver 282 may turn off the $(1\text{-}1)^{th}$ to $(1\text{-}n)^{th}$ pull-up transistors MP0-1, MP0-2, ..., and MP0-$n$ and the second-1 to second-n pull-up transistors MP1-1, MP1-2, ..., and MP1-$n$.

In addition, the driver 282 may selectively turn on the $(1-1)^{th}$ to $(1-n)^{th}$ pull-down transistors MN0-1, MN0-2, ..., and MN0-n and the second-1 to second-n pull-down transistors MN1-1, MN1-2, ..., and MN1-n by selectively enabling the $(1-1)^{th}$ to $(1-n)^{th}$ pull-down driving signals DDS0-1, DDS0-2, ..., and DDS0-n and the second-1 to second-n pull-down driving signals DDS1-1, DDS1-2, ..., and DDS1-n when the signal reception operation or the signal transmission operation is performed in the card mode.

As described above, the transmitter 280b drives the $(1-1)^{th}$ to $(1-n)^{th}$ pull-up transistors MP0-1, MP0-2, ..., and MP0-n, the second-n pull-up transistors MP1-1, MP1-2, ..., and MP1-n, the $(1-1)^{th}$ to $(1-n)^{th}$ pull-down transistors MN0-1, MN0-2, ..., and MN0-n and the second-1 to second-n pull-down transistors MN1-1, MN1-2, ..., and MN1-n based on the transmission modulation signal TMS in the reader mode to perform the normal operation to provide the transmission signal TS to the resonance unit 100b. In addition, when the signal reception operation or the signal transmission operation is performed in the card mode, the transmitter 280b selectively connects the first transmission terminal TX1 and the second transmission terminal TX2 to the ground voltage GND through the $(1-1)^{th}$ to $(1-n)^{th}$ pull-down transistors MN0-1, MN0-2, ..., and MN0-n and the second-1 to second-n pull-down transistors MN1-1, MN1-2, ..., and MN1-n, respectively, thereby changing the Q factor of the resonance unit 100b.

Figure 25:
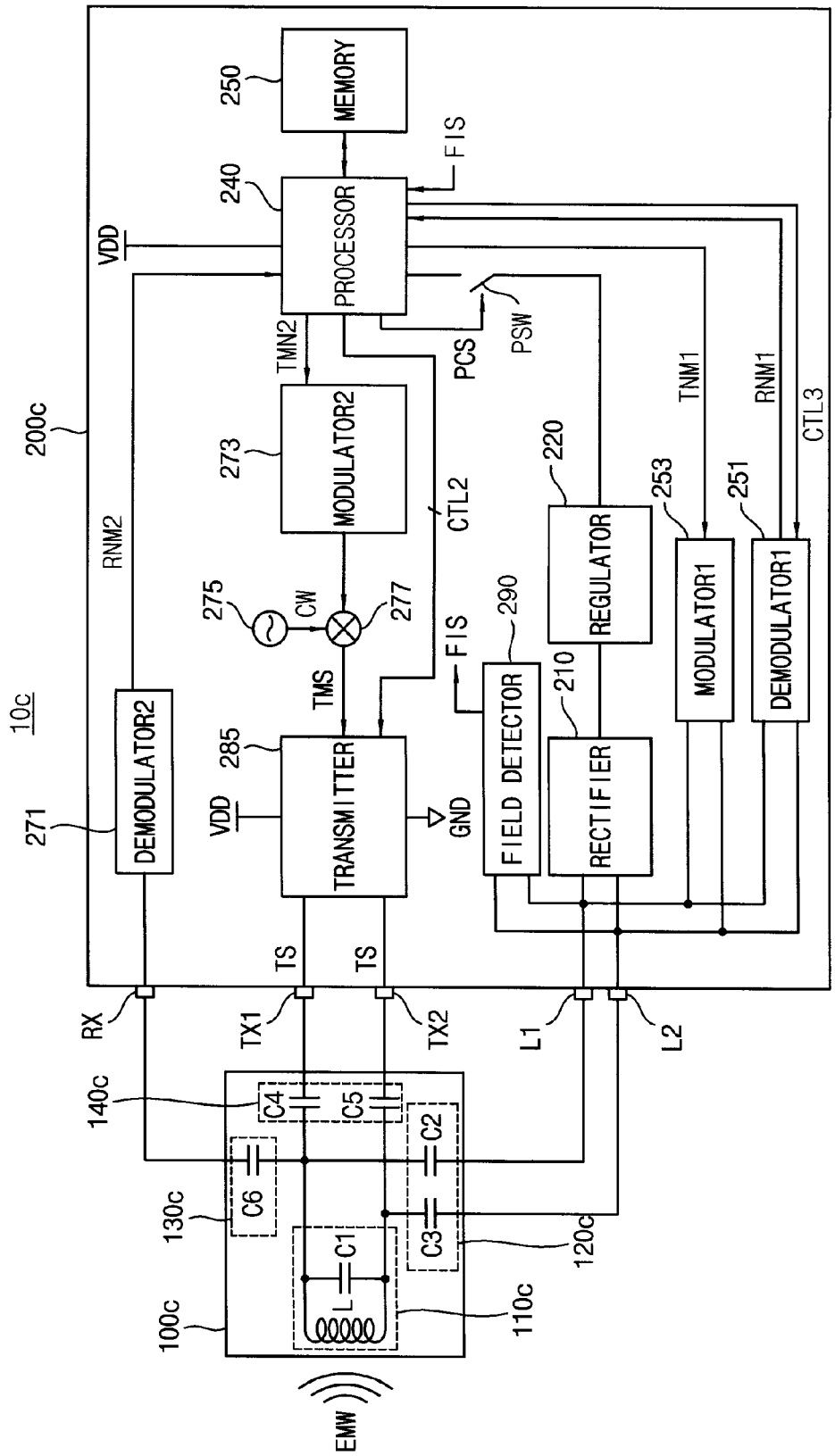
FIG. 25 is a block diagram illustrating another example of the NFC device of FIG. 1.

FIG. 25 is a block diagram illustrating another example of the NFC device of FIG. 1. Elements used to operate the NFC device 10c in the reader mode as well as elements used to operate the NFC device 10c in the card mode are illustrated in FIG. 25. Referring to FIG. 25, the NFC device 10c may include a resonance unit 100c and an NFC chip 200c.

The NFC chip 200c may be connected to the resonance unit 100c through a first power terminal L1, a second power terminal L2, a first transmission terminal TX1, a second transmission terminal TX2, and a reception terminal RX.

The resonance unit 100c may include a resonance circuit 110c having an antenna L and a first capacitor C1, a first filter 120c having a second capacitor C2 and a third capacitor C3 to connect the resonance circuit 110c to the first and second power terminals L1 and L2, a second filter 130c having a sixth capacitor C6 to connect the resonance circuit 110b to the reception terminal RX, and a matching unit 140c including a fourth capacitor C4 and a fifth capacitor C5 to connect the resonance circuit 110c to the first transmission terminal TX1 and the second transmission terminal TX2 in order to perform the impedance matching.

The NFC device 10c of FIG. 25 is similar to the NFC device 10b of FIG. 22 except that the NFC device 10c of FIG. 25 further includes a field detector 290. Thus, to avoid redundancy, the following description will be made while focusing on the field detector 290 without explaining the elements illustrated in the NFC device 10b.

The field detector 290 may measure the voltage supplied from the resonance unit 100c through the first power terminal L1 and the second power terminal L2 to generate a field intensity signal FIS corresponding to the magnitude of the measured voltage. As the intensity of the EMW received from the NFC reader 20 becomes strong, the magnitude of the voltage supplied to the first power terminal L1 and the second power terminal L2 from the resonance unit 100c is increased, so the field intensity signal FIS may represent the intensity of EMW received from the NFC reader 20.

The processor 240 may provide the transmitter 280 with the control signal CTL2 having a plurality of bits indicating a mode and operation of the NFC device 10c based on the field intensity signal FIS, the mode and the operation of the NFC device 10c. The processor 240 may determine whether the NFC reader 20 is near the NFC device 10b and whether the signal transmission and/or reception operation is normally performed based on the field intensity signal FIS.

Figure 26:
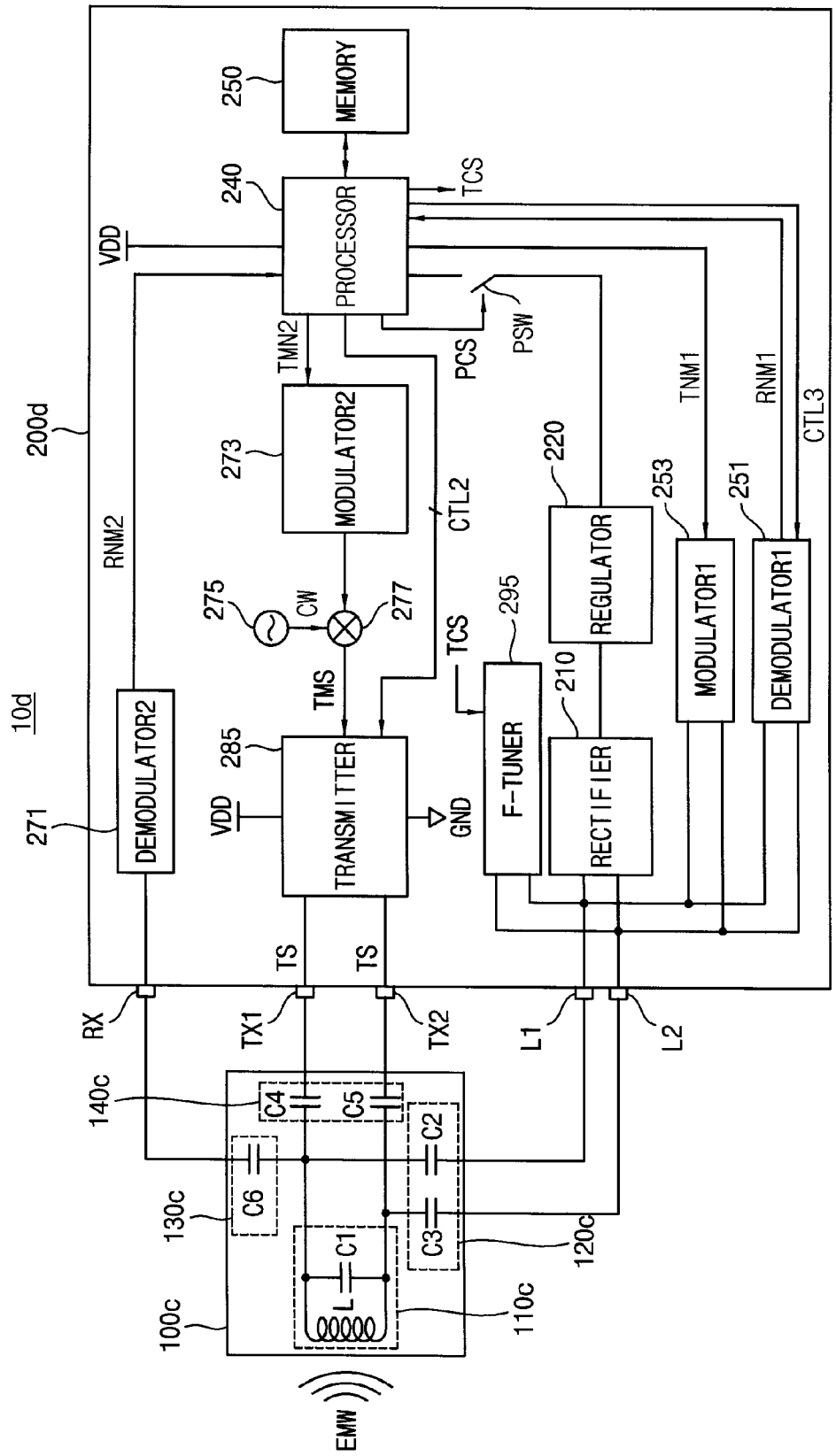
FIG. 26 is a block diagram illustrating another example of the NFC device of FIG. 1.

FIG. 26 is a block diagram illustrating another example of the NFC device of FIG. 1. Referring to FIG. 26, an NFC device 10d may include a resonance unit 100c and an NFC chip 200d. The NFC chip 200d may be connected to the resonance unit 100c through a first power terminal L1, a second power terminal L2, a first transmission terminal TX1, a second transmission terminal TX2, and a reception terminal RX.

The NFC device 10d of FIG. 26 is similar to the NFC device 10d of FIG. 25 except that the NFC device 10d of FIG. 25 includes a frequency tuner 295 instead of the field detector 290. Thus, to avoid redundancy, the following description will be made while focusing on the frequency tuner 295 without explaining the elements illustrated in the NFC device 10c.

The frequency tuner 295 may change a resonance frequency of the resonance unit 100c by connecting a capacitive load to the resonance unit 100c through the first and second power terminals L1 and L2. The capacitive load may have a capacitance corresponding to a tuning control signal TCS provided from the processor 240, and the tuning control signal TCS includes a plurality of bits.

Figure 27:
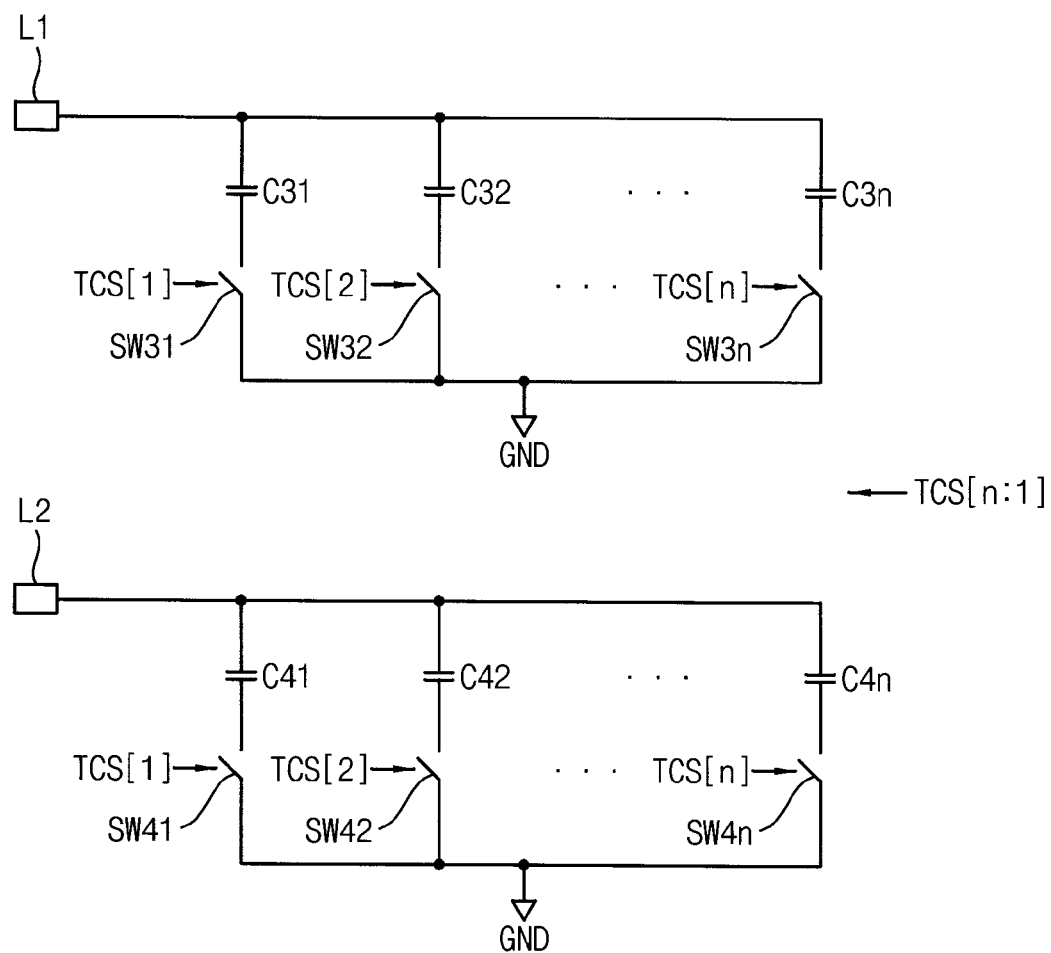
FIG. 27 is a block diagram illustrating an example of the frequency tuner included in the NFC device of FIG. 26.

FIG. 27 is a block diagram illustrating an example of the frequency tuner included in the NFC device of FIG. 26. Referring to FIG. 27, the frequency tuner 295 may include first to $n^{th}$ capacitors C31, C32, ..., and C3n, first to $n^{th}$ switches SW31, SW32, ..., and SW3n, first to $n^{th}$ capacitors C41, C42, ..., and C4n, and first to $n^{th}$ switches SW41, SW42, ..., and SW4n, wherein 'n' is an integer of 2 or more.

The first to $n^{th}$ switches SW31, SW32, ..., and SW3n may be connected in series to the first to $n^{th}$ capacitors C31, C32, ..., and C3n, respectively. The first to $n^{th}$ switches SW41, SW42, ..., and SW4n may be connected in series to the first to $n^{th}$ capacitors C41, C42, ..., and C4n, respectively. The first to $n^{th}$ capacitors C31, C32, ..., and C3n and the first to $n^{th}$ switches SW31, SW32, ..., and SW3n may be connected in parallel between the first power terminal L1 and the ground voltage GND. The first to $n^{th}$ capacitors C41, C42, ..., and C4n and the first to $n^{th}$ switches SW41, SW42, ..., and SW4n may be connected in parallel between the second power terminal L2 and the ground voltage GND.

The tuning control signal TCS provided from the processor 240 may be an n-bit signal. Each bit included in the tuning control signal TCS may control the first to $n^{th}$ switches SW31, SW32, ..., and SW3n and the first to $n^{th}$ switches SW41, SW42, ..., and SW4n.

As described above, since the capacitance of the capacitive loads which the frequency tuner 295 connects between the first power terminal L1 and the ground voltage GND and second power terminal L2 and the ground voltage GND are based on the tuning control signal TCS, the processor 240 may change the resonance frequency of the resonance unit 100c by changing the tuning control signal TCS.

Figure 28:
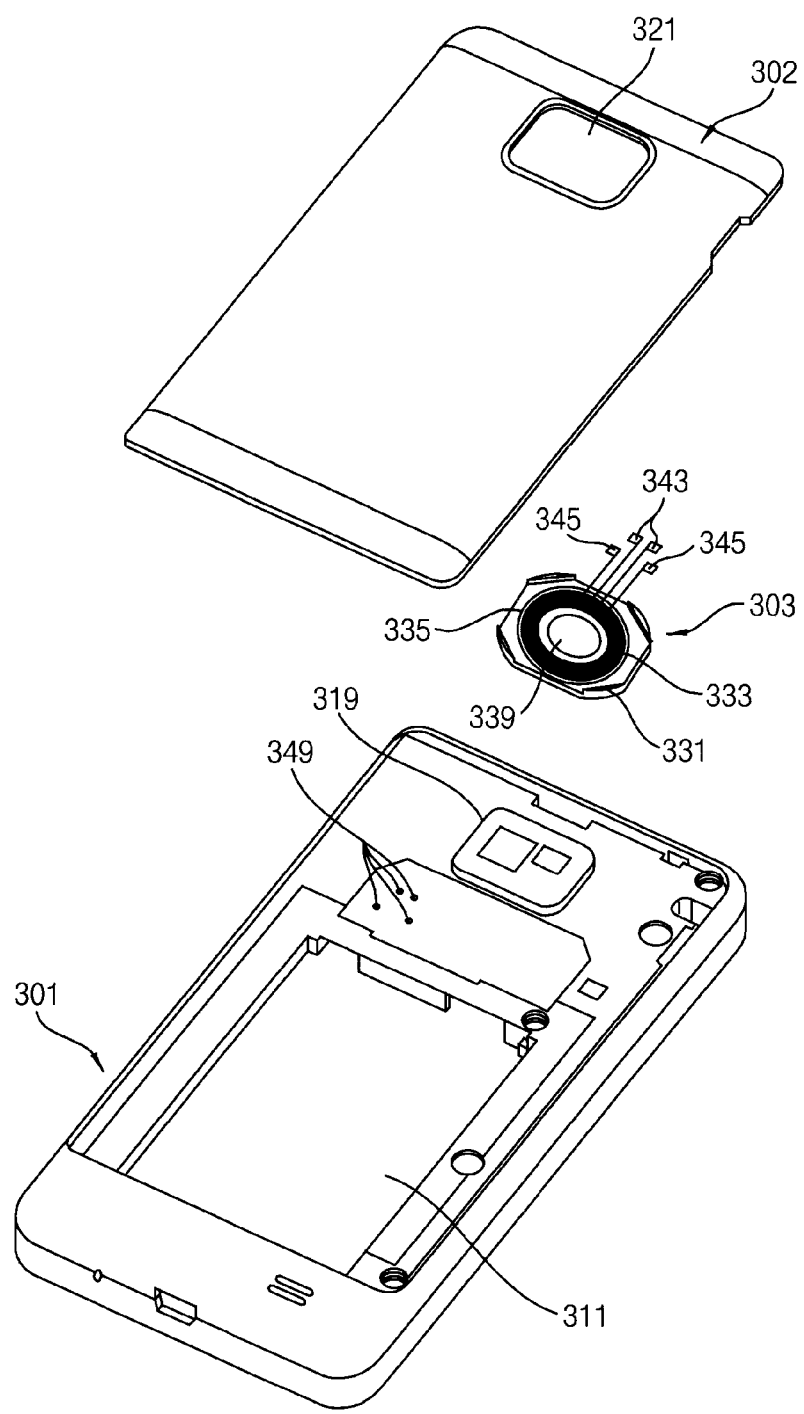
FIG. 28 is an exploded perspective view of a portable terminal (for example a "cell phone") according to some embodiments.
Figure 29:
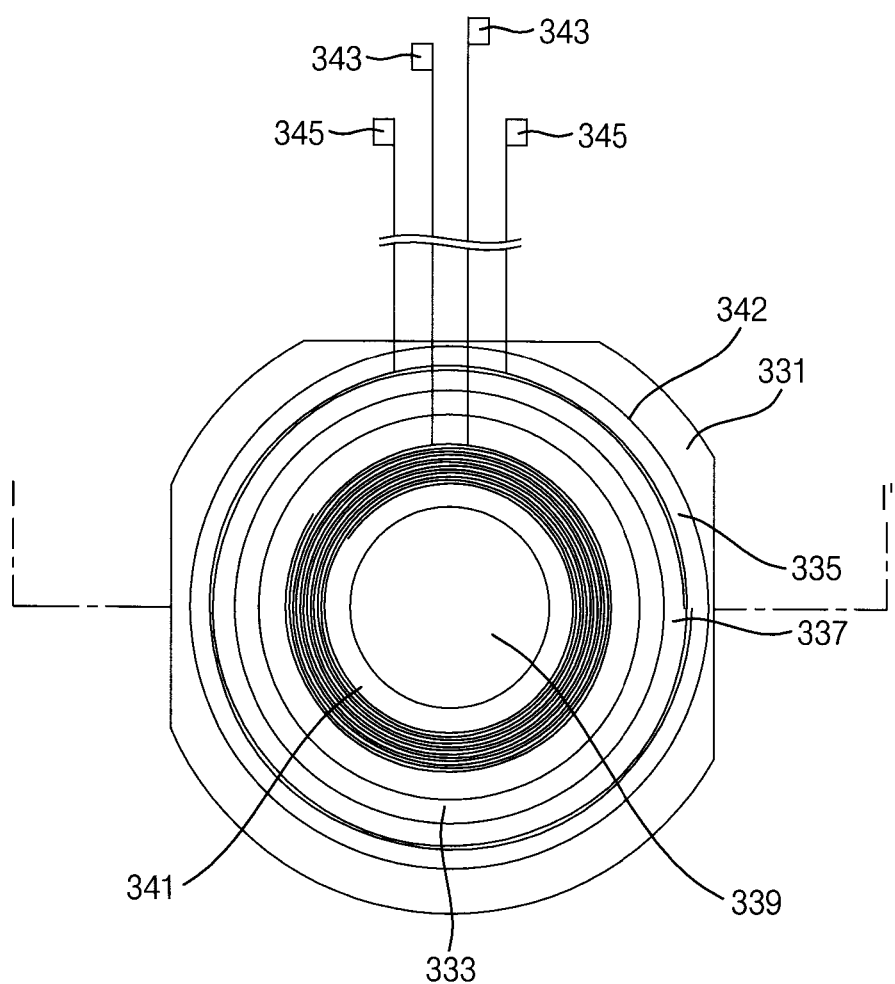
FIG. 29 is a plan view of a coil module in the portable terminal of FIG. 28.
Figure 30:
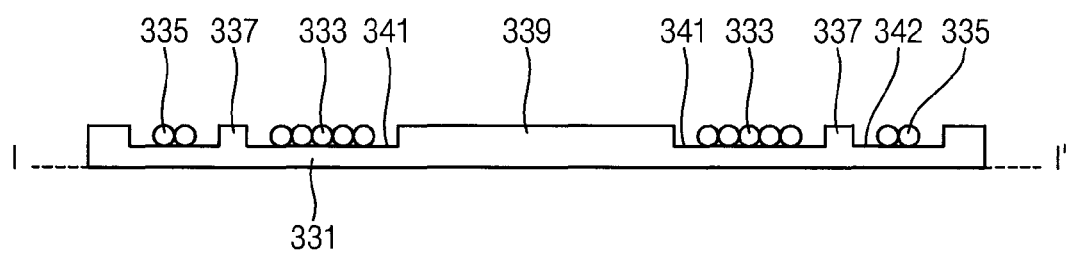
FIG. 30 is a cross-sectional view of the coil module in FIG. 29 taken along I-I'.

FIG. 28 is an exploded perspective view of a portable terminal (for example a "cell phone") according to some embodiments. FIG. 29 is a plan view of a coil module in the portable terminal of FIG. 28. FIG. 30 is a cross-sectional view of the coil module in FIG. 29 taken along I-I'.

Referring to FIG. 28, FIG. 29 and FIG. 30, a portable terminal 300 includes a shielding member 331 attached to an inner surface of an external part such as a battery cover 302 or a housing 301, and a pair of coils 333 and 335 attached to the shielding member 331. The coils 333 and 335 are mounted on a same plane. The shielding member 331 and the coils 333 and 335 are collectively referred to herein as a coil module 303.

Referring to FIG. 28, the portable terminal 300 is a bar type terminal having a touch screen display. Other types of terminals are envisioned within the scope of this disclosure, including different physical form factors and display types. While not shown, the display, function keys (such as Start/End and Select keys), a transmitter, and a receiver are installed on a front surface of the housing 301.

The housing 301 is provided on a rear surface of the portable terminal 300, with a battery mounting recess 311 for accommodating a battery pack. The battery cover 302 covers the battery mounting recess 311. A plurality of terminals 349 and a camera module 319 are installed at one side of the battery mounting recess 311, with the terminals 349 also being covered by the battery cover 302. An opening 321 penetrates through both surfaces of the battery cover 302. The camera module 319 is accommodated in the opening 321, thereby securing a capturing path. At least one of a connector terminal, a memory slot, a volume key, and a camera shutter switch (not shown) may be arranged on a side surface of the housing 301.

The coil module 303 is attached to the inner surface of the battery cover 302 and is connected to the circuits of the portable terminal 300, (e.g. a communication circuit or a charging circuit) via the plurality of terminals 349. As illustrated in FIG. 28, FIG. 29 and FIG. 30, the coil module 303 includes the shielding member 331 and the coils 333 and 335.

The shielding member 331 may be formed by injection molding, having first and second accommodation grooves 341 and 342 respectively on a surface thereof. The first and second accommodation grooves 341 and 342 respectively are circular in shape and recessed into one surface of the shielding member 331. The second accommodation groove 342 surrounds the first accommodation groove 341, being concentric with the first accommodation groove 341. A shielding wall 337 is interposed between the first and second accommodation grooves 341 and 342.

A pellet comprised of a mixture of metal powder containing an iron (Fe) component and synthetic resin is injection-molded into the shielding member 331. The synthetic resin is preferably Poly Carbonate (PC), Poly Amide (PA), Acrylonitrile-Butadiene-Styrene (ABS) copolymer, or Nylon. As stated above, the shielding member 331 contains the iron component which prevents mutual interference between the coils 333 and 335, and prevents the coils 333 and 335 from impacting circuits within the portable terminal 300, caused by electronic waves generated from high-frequency waves, low-frequency waves, or power applied to the coils 333 and 335.

As illustrated in FIGS. 29 and 30, the first coil 333 is accommodated in the first accommodation groove 341 and the second coil 335 is accommodated in the second accommodation groove 342. The first coil 333 and the second coil 335 are formed by spirally winding enamel-insulated conductor wires.

The first coil 333 and the second coil 335 are accommodated in the first and second accommodation grooves 341 and 342, respectively, and the second coil 335 surrounds the first coil 333. Herein, the shielding wall 337 between the first coil 333 and the second coil 335 provides a shielding effect between the coils. In other words, the shielding wall 337 shields interference of electronic waves between the first and second coils 333 and 335 respectively. The first coil 333 and the second coil 335 have connection ends 343 and 345, respectively, extended from one side of the shielding member 331. The connection ends 343 and 345 are connected to circuits of the portable terminal 300 via the plurality of terminals 349 provided on the housing 301.

When installed, the first coil 333 and the second coil 335 are exposed from one surface of the shielding member 331. However, the first coil 333 and the second coil 335 face the inner surface of the battery cover 302 when the shielding member 331 is attached to the battery cover 302, thereby covering the first and second coils 333 and 335 respectively. Consequently, the first coil 333 and the second coil 335 are covered by the shielding member 331 and the battery cover 302.

One of the first and second coils 333 and 335 respectively may be used as a secondary coil for wireless charging and the other coil may be used as an NFC antenna element. The coils 333 and 335 may also be used as antennas for short-range wireless communication, (e.g. Bluetooth™ or terrestrial multimedia broadcasting antennas). The embodiments of the inventive concepts utilize the first coil 333 as a secondary coil for wireless charging and utilize the second coil 335 as an NFC antenna element.

For wireless charging, the portable terminal 300 may be cradled on a charging cradle (not shown) to align a primary coil of a charger with the secondary coil of the portable terminal 300 corresponding to the first coil 333. Alternatively, the primary coil is movably mounted in the charging cradle such that when the portable terminal 300 is positioned on the charging cradle, the primary coil is moved to align with the portable terminal 300.

To align the primary coil of the charging cradle with the first coil 333 of the portable terminal 300, the shielding member 331 may have a protrusion portion 339. The protrusion portion 339 protrudes from the first accommodation groove 341 of the shielding member 331. Because the shielding member 331 contains the iron component, the protrusion portion 339 also contains an iron component. That is, because the protrusion portion 339 contains a paramagnetic material, (e.g. the iron component), when the protrusion portion 339 is positioned within the magnetic field of a permanent magnet, an attraction force of the permanent magnet pulls on the protrusion portion 339.

The permanent magnet is attached to the primary coil of the charging cradle. When the portable terminal 300 is mounted on the charging cradle, the attraction force between the permanent magnet and the shielding member 331, (particularly the protrusion portion 339), aligns the primary coil of the charging cradle with the first coil 333 of the portable terminal 300. Furthermore, while the protrusion portion 339 contains the iron component and thus has a paramagnetic property, the protrusion portion 339 may have an additional magnetic portion attached on the first accommodation groove 341 to increase the attraction force between the permanent magnet of the primary coil and the shielding member 331. Preferably, the additional magnetic portion is formed of a paramagnetic material.

Figure 31:
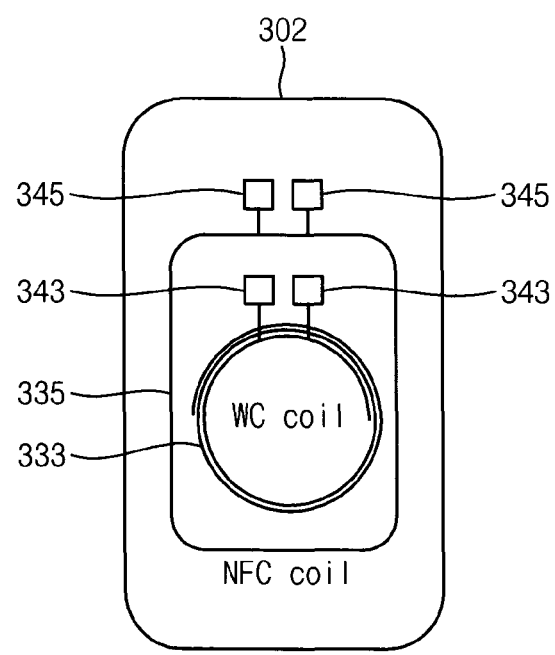
FIG. 31 illustrates mounting of the coil module of FIG. 29 to a battery cover of the portable terminal according to example embodiments.
Figure 32:
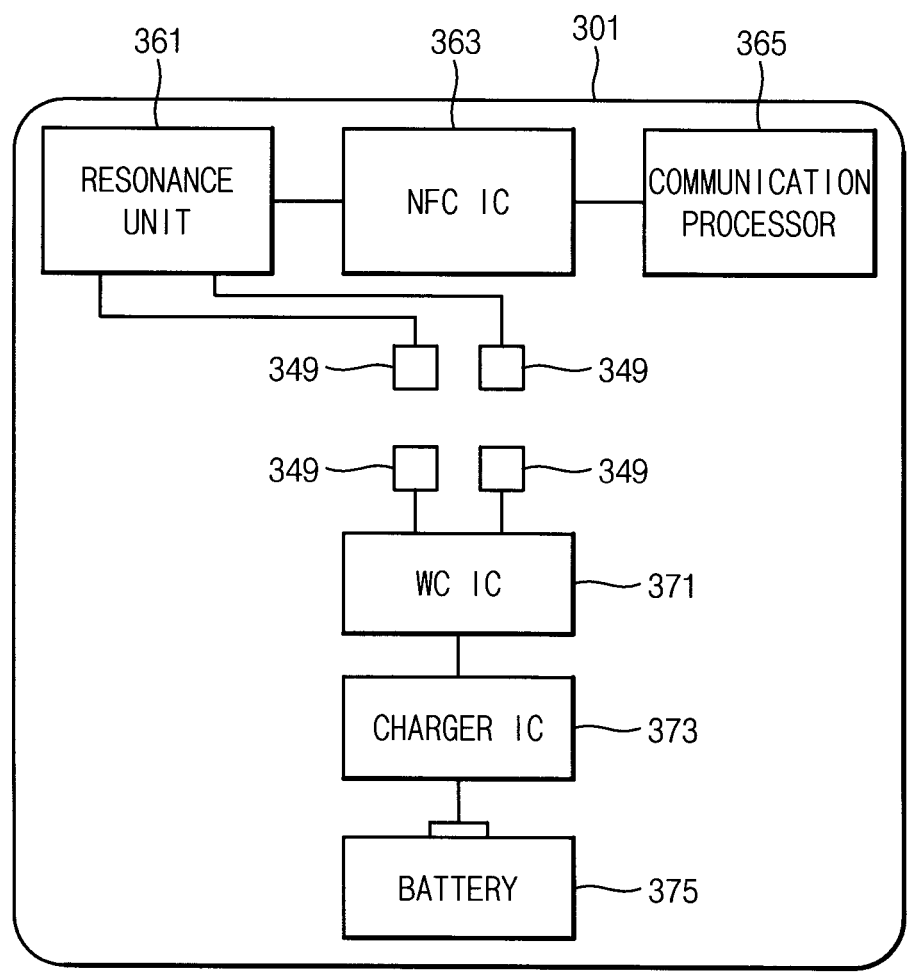
FIG. 32 is a schematic view of the portable terminal of FIG. 28, with which the battery cover illustrated in FIG. 31 is combinable.

FIG. 31 illustrates mounting of the coil module of FIG. 29 to a battery cover of the portable terminal according to example embodiments. FIG. 32 is a schematic view of the portable terminal of FIG. 28, with which the battery cover illustrated in FIG. 31 is combinable.

FIG. 31 and FIG. 32 illustrate configurations of a portable terminal that implements both a wireless charging function and an NFC function using the coil module 303, with the first coil 333 as a secondary coil used for wireless charging and the second coil 335 as an antenna element for NFC, by way of example.

FIG. 31 illustrates mounting of the coil module 303 on the battery cover 302 of the portable terminal 300 and FIG. 32 illustrates the housing 301 to be combined with the battery cover 302 illustrated in FIG. 31.

To implement the wireless charging function and the NFC function using the first and second coils 333 and 335 respectively, the coils 333 and 335 are connected to a communication processor 365 and a charge integrated circuit (IC) 373, respectively. A resonance unit 361 and an NFC IC 363 or a wireless charger (WC) IC 371 is disposed on a connection of the first coil 333 or the second coil 335 to a circuit of the portable terminal 300. These ICs control current and voltage during charging. The resonance unit 361 may use the resonance unit 100a of FIG. 13 or the resonance unit 100b of FIG. 22, and the NFC IC 363 may use the NFC chip 200a of FIG. 13, the NFC chip 200b of FIG. 22 or the NFC chip 200c of FIG. 25. Therefore, the NFC IC 363 may change the RF configuration parameter of the resonance unit 361 and may retry signal transmission operation or signal reception operation when errors occur in the signal transmission operation or the signal reception operation.

According to the embodiment in FIG. 31 and FIG. 32, the NFC IC 363 is connected to the communication processor 365 of the portable terminal 300 and to the second coil 335 mounted to the battery cover 302 via the plurality of terminals 349. The charger IC 373 is installed inside the portable terminal 300 and connected to the battery pack. In addition, the WC IC 371 is connected to the charger IC 373 inside the portable terminal 300 and to the first coil 333 mounted to the battery cover 302 through the remaining plurality of terminals 349.

Figure 33:
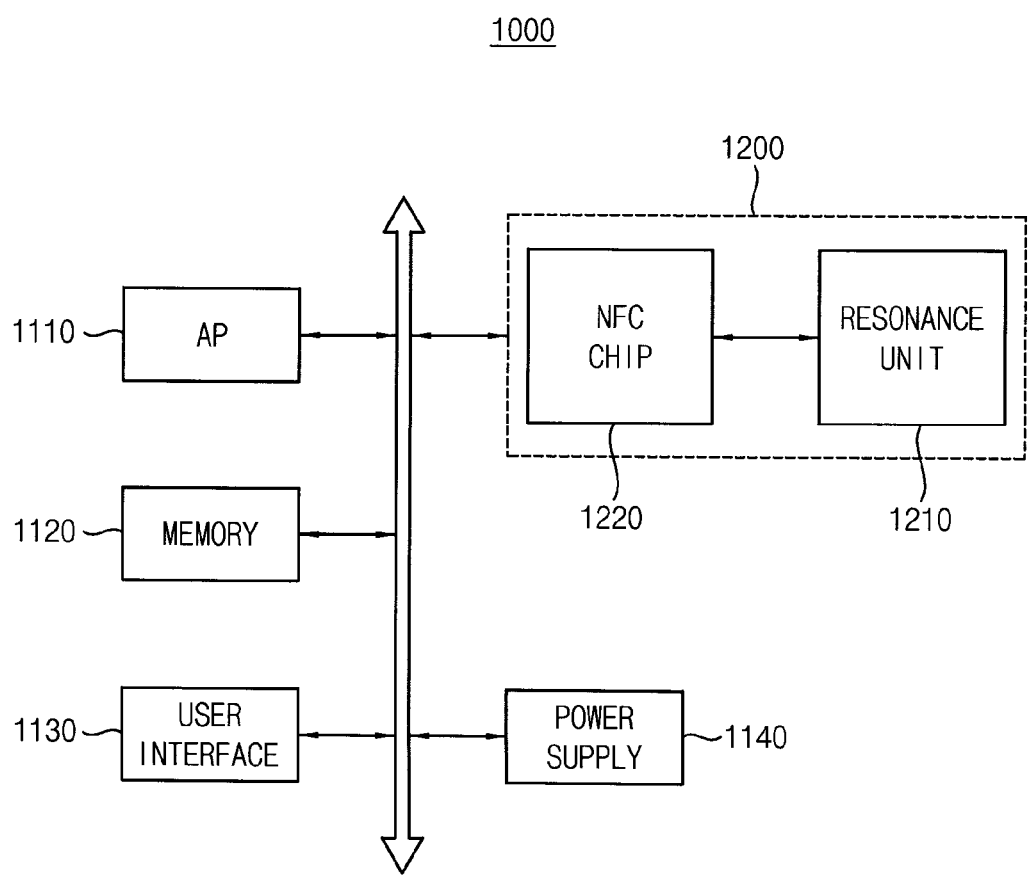
FIG. 33 is a block diagram illustrating an electronic system according to some embodiments.

FIG. 33 is a block diagram illustrating an electronic system according to some embodiments. Referring to FIG. 33, an electronic system 1000 includes an application processor 1110, an NFC device 1200, a memory device 1120, a user interface 1130 and a power supply 1140. In some embodiments, the electronic system 1000 may be a mobile phone, a smart phone, a personal digital assistant (PDA), a portable multimedia player (PMP), a digital camera, a music player, a portable game console, a navigation system, a laptop computer, or the like.

The application processor 1110 may control overall operations of the electronic system 1000. The application processor 1110 may execute applications, such as a web browser, a game application, a video player, etc. In some embodiments, the application processor 1110 may include a single core or multiple cores. For example, the application processor 1110 may be a multi-core processor, such as a dual-core processor, a quad-core processor, a hexa-core processor, etc. The application processor 1110 may include an internal or external cache memory.

The memory device 1120 may store data required for an operation of the electronic system 1000. For example, the memory device 1120 may store a boot image for booting the electronic system 1000, output data to be outputted to an external device and input data received from the external device. For example, the memory device 1120 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM) or a ferroelectric random access memory (FRAM).

The NFC device 1200 may provide the output data stored in the memory device 1120 to the external device through NFC and store the input data received from the external device through NFC into the memory device 1120. The NFC device 1200 may include a resonance unit 1210 and an NFC chip 1220. The resonance unit 1210 may use the resonance unit 100a of FIG. 13 or the resonance unit 100b of FIG. 22, and the NFC chip 1220 may use the NFC chip 200a of FIG. 13, the NFC chip 200b of FIG. 22 or the NFC chip 200c of FIG. 25. Therefore, the NFC chip 1220 may change the RF configuration parameter of the resonance unit 1210 and may retry signal transmission operation or signal reception operation when errors occur in the signal transmission operation or the signal reception operation.

The user interface 1130 may include at least one input device, such as a keypad or a touch screen, and at least one output device, such as a speaker or a display device. The power supply 1140 may supply a power supply voltage to the electronic system 1000.

In some embodiments, the electronic system 1000 may further include an image processor, and/or a storage device, such as a memory card, a solid state drive (SSD), a hard disk drive (HDD) or a CD-ROM.

In some embodiments, the electronic system 1000 and/or components of the electronic system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The example embodiments may be used in an electronic device including an NFC device. For example, the example embodiments may be applicable to a mobile phone, a smart phone, a personal digital assistant (PDA), a portable multimedia player (PMP), a digital camera, a music player, a portable game console, a navigation system or a laptop computer.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a near field communication (NFC) device, the method comprising:
    receiving, by the NFC device, a first signal from an NFC reader;
    transmitting, by the NFC device, a response to the first signal to the NFC reader; and changing selectively, by the NFC device, a radio frequency (RF) configuration parameter associated with signal transmission operation during a signal transmission interval, based on the NFC device determining whether the NFC reader recognizes the response, wherein the NFC device increases a bandwidth of the NFC device during the signal transmission interval by changing the RF configuration parameter, when the NFC reader does not recognize the response.

2. The method of claim 1, wherein the NFC device comprises a resonance unit and an NFC chip coupled to the resonance unit through at least a first transmission terminal and a second transmission terminal, wherein the NFC chip comprises a transmitter, wherein the transmitter changes the RF configuration parameter during the signal transmission interval by changing a quality factor of the resonance unit, and wherein the NFC chip changes the quality factor of the resonance unit by selectively connecting the first transmission terminal and the second transmission terminal to a ground voltage through a pull-down load.

3. A method of operating a near field communication (NFC) device, the method comprising:

receiving, by the NFC device, a first signal from an NFC reader;

transmitting, by the NFC device, a response to the first signal to the NFC reader; and changing selectively, by the NFC device, a radio frequency (RF) configuration parameter associated with signal transmission operation during a signal transmission interval, based on the NFC device determining whether the NFC reader recognizes the response, wherein said determining whether the NFC reader recognizes the response comprises determining whether an intensity of an electromagnetic wave which the NFC device receives from the NFC reader is maintained prior to elapsing of a reference time that starts when the NFC device transmits the response, wherein the NFC device changes the RF configuration parameter during the signal transmission interval upon determination that the intensity is maintained when the reference time elapses.

4. The method of claim 3, wherein the NFC device again transmits a response to the first signal received from the NFC reader after the NFC device changes the RF configuration parameter.

5. The method of claim 3, wherein the NFC device comprises a resonance unit and an NFC chip coupled to the resonance unit through a first power terminal and a second power terminal, wherein the NFC chip comprises a load modulation tuner coupled to the first power terminal, the second power terminal and a ground voltage, wherein the NFC chip changes the RF configuration parameter during the signal transmission interval by changing a load modulation amount of the load modulation tuner, and wherein the NFC chip changes the RF configuration parameter by the load modulation tuner selectively connecting one of a current load and a resistive load between at least one of the first power terminal and the ground voltage, and the second power terminal and the ground voltage.

6. A method of operating a near field communication (NFC) device, the method comprising:

receiving, by the NFC device, a first signal from an NFC reader;

transmitting, by the NFC device, a response to the first signal to the NFC reader; and changing selectively, by the NFC device, a radio frequency (RF) configuration parameter associated with signal transmission operation during a signal transmission interval, based on the NFC device determining whether the NFC reader recognizes the response, wherein said determining whether the NFC reader recognizes the response comprises receiving, by the NFC device, a second signal from the NFC reader, and determining, by the NFC device, whether the first signal is the same as the second signal, wherein the NFC device changes the RF configuration parameter during the signal transmission interval upon determination that the first signal is the same as the second signal.

7. The method of claim 6, further comprising transmitting, by the NFC device, a response to the second signal to the NFC reader without changing the RF configuration parameter when the first signal is not the same as the second signal.

8. The method of claim 6, wherein the first signal and the second signal are polling requests for requesting a transmission of reception acknowledgement information of the NFC device.

9. A method of operating a near field communication (NFC) device, the method comprising:

receiving, by the NFC device, an input message from an NFC reader;

changing selectively, by the NFC device, a radio frequency (RF) configuration parameter associated with a signal reception operation during a signal reception interval, based on the NFC device determining whether the signal reception operation is regularly performed; and transmitting, by the NFC device, a response to the input message to the NFC reader using the changed RF configuration parameter.

10. The method of claim 9, wherein said determining whether the signal reception operation is regularly performed comprises:

determining, by a processor of the NFC device, whether a pattern of the input message is irregular, wherein the NFC device changes the RF configuration parameter during the signal reception interval upon determination that the pattern of the input message is irregular.

11. The method of claim 10, further comprising receiving, by the NFC device, the input message from the NFC reader after the NFC device changes the RF configuration parameter.

12. The method of claim 9, wherein said determining whether the signal reception operation is regularly performed comprises:

determining, by a processor of the NFC device, whether an error occurs in a cyclic redundancy check (CRC) pattern in the input message, wherein the NFC device changes the RF configuration parameter during the signal reception interval when an error occurs in the CRC pattern.

13. The method of claim 9, wherein said determining whether the signal reception operation is regularly performed comprises:

determining, by a processor of the NFC device, whether a data pattern in the input message is correct;

refreshing a timer in the processor when the data pattern is correct; and determining whether a reference time elapses after the timer is refreshed, wherein the NFC device changes the RF configuration parameter during the signal reception interval when the reference time elapses after the timer is refreshed.

14. The method of claim 9, wherein the NFC device comprises a resonance unit and an NFC chip coupled to the resonance unit through at least a first transmission terminal and a second transmission terminal, wherein the NFC chip includes a transmitter, wherein the transmitter changes the RF configuration parameter during the signal reception interval by changing a quality factor of the resonance unit, and wherein the NFC chip changes the quality factor of the resonance unit by selectively connecting the first transmission terminal and the second transmission terminal to a ground voltage through a pull-down load.

15. The method of claim 9, wherein the NFC device comprises a resonance unit and an NFC chip coupled to the resonance unit through at least a first power terminal and a second power terminal, wherein the NFC chip comprises a frequency tuner coupled to the first power terminal, the second power terminal and a ground voltage, wherein the frequency tuner changes the RF configuration parameter during the signal reception interval by changing a resonance frequency of the resonance unit, and wherein the NFC chip changes the RF configuration parameter by the frequency tuner selectively connecting a capacitive load between the first power terminal and the ground voltage and between the second power terminal and the ground voltage.

16. The method of claim 9, wherein the NFC device comprises a resonance unit and an NFC chip coupled to the resonance unit through at least a first power terminal and a second power terminal, wherein the NFC chip comprises a demodulator that demodulates the input message, and wherein the NFC chip changes the RF configuration parameter during the signal reception interval by adjusting an intensity of amplification of the input message in the demodulator.

* * * * *